(12) United States Patent
D'Halluin et al.

(10) Patent No.: US 11,210,211 B2
(45) Date of Patent: Dec. 28, 2021

(54) KEY DATA STORE GARBAGE COLLECTION AND MULTIPART OBJECT MANAGEMENT

(71) Applicant: Western Digital Technologies, Inc., San Jose, CA (US)

(72) Inventors: Carl Rene D'Halluin, Zwijnaarde (BE); Bastiaan Stougie, Havant (BE); Koen De Keyser, Sint-Denijs Westrem (BE); Thomas Demoor, Ghent (BE)

(73) Assignee: Western Digital Technologies, Inc., San Jose, CA (US)

( * ) Notice: Subject to any disclaimer, the term of this patent is extended or adjusted under 35 U.S.C. 154(b) by 239 days.

(21) Appl. No.: 16/010,518

(22) Filed: Jun. 18, 2018

(65) Prior Publication Data

US 2019/0057027 A1    Feb. 21, 2019

Related U.S. Application Data

(60) Provisional application No. 62/548,389, filed on Aug. 21, 2017.

(51) Int. Cl.
*G06F 12/02* (2006.01)
*G06F 16/901* (2019.01)

(52) U.S. Cl.
CPC ...... *G06F 12/0253* (2013.01); *G06F 16/9017* (2019.01); *G06F 2212/1024* (2013.01);
(Continued)

(58) Field of Classification Search
CPC ............... G06F 16/125; G06F 16/1815; G06F 12/0253; G06F 2212/1044;
(Continued)

(56) References Cited

U.S. PATENT DOCUMENTS 5,280,612 A    1/1994 Lorie et al.
5,682,537 A    10/1997 Davies et al.
(Continued)

FOREIGN PATENT DOCUMENTS

CN    105740447 A    7/2016
IN    2015KO00101 A    12/2015
(Continued)

OTHER PUBLICATIONS

Hoffer, Jeffrey A. et al., Modern Database Management, Advanced Database Topics, Part V, Chapter 12, "Distributed Databases," 2013, 28 pages <http://wps.pearsoned.co.uk/wps/media/objects/10977/11240737/Web%20chapters/Chapter%2012_WEB.pdf>.
(Continued)

*Primary Examiner* — Marc S Somers
(74) *Attorney, Agent, or Firm* — Patent Law Works LLP

(57) ABSTRACT

In an example embodiment, a method comprises determining that a multipart upload request to upload a data object in separate object parts has been received by an object storage service; generating temporary keys for the separate object parts of the data object; storing the temporary keys in a temporary key data store; generating, based on the temporary keys, a multipart key entry for the data object, the multipart key entry comprising a multipart key that contains an object identifier identifying the data object and an inverse timestamp; and inserting the multipart key entry in a persistent key data store storing an ordered set of key entries in a position determined by the object identifier and the inverse timestamp.

19 Claims, 8 Drawing Sheets

(52) U.S. Cl.
CPC ............... *G06F 2212/1044* (2013.01); *G06F 2212/154* (2013.01); *G06F 2212/163* (2013.01)

(58) Field of Classification Search
CPC ....... G06F 2212/1024; G06F 2212/154; G06F 2212/163; G06F 16/9017
See application file for complete search history.

(56) References Cited

U.S. PATENT DOCUMENTS

| | | | |
|---|---|---|---|
| 5,806,074 | A | 9/1998 | Souder et al. |
| 5,937,414 | A | 8/1999 | Souder et al. |
| 5,974,425 | A * | 10/1999 | Obermarck ......... G06F 11/1471 707/682 |
| 6,434,575 | B1 | 8/2002 | Berry et al. |
| 6,496,830 | B1 * | 12/2002 | Jenkins, Jr. ............. G06F 16/30 |
| 6,606,626 | B1 | 8/2003 | Ponnekanti |
| 7,962,458 | B2 | 6/2011 | Holenstein et al. |
| 9,165,002 | B1 * | 10/2015 | Lazier ................... G06F 16/162 |
| 9,171,044 | B2 | 10/2015 | Schleimer et al. |
| 9,223,877 | B1 | 12/2015 | Cao et al. |
| 9,317,576 | B2 | 4/2016 | Merriman et al. |
| 9,396,202 | B1 | 7/2016 | Drobychev et al. |
| 9,400,828 | B2 | 7/2016 | Kesselman et al. |
| 9,460,008 | B1 * | 10/2016 | Leshinsky ........... G06F 12/0238 |
| 10,409,692 | B1 * | 9/2019 | Brenner ................ G06F 3/0671 |
| 10,514,985 | B1 * | 12/2019 | Patwardhan ........ G06F 11/1451 |
| 2002/0116356 | A1 * | 8/2002 | Ieong ..................... G06F 16/273 |
| 2005/0223277 | A1 * | 10/2005 | Ballard ............... G06F 11/1456 714/15 |
| 2009/0228443 | A1 | 9/2009 | Lapin et al. |
| 2010/0094813 | A1 * | 4/2010 | Brueggemann ..... G06F 16/1748 707/692 |
| 2011/0302143 | A1 | 12/2011 | Lomet |
| 2012/0254175 | A1 | 10/2012 | Horowitz et al. |
| 2013/0006993 | A1 | 1/2013 | Kobayashi |
| 2013/0024722 | A1 * | 1/2013 | Kotagiri ............. G06F 11/1004 714/6.1 |
| 2013/0073532 | A1 * | 3/2013 | Bachar .................... G06F 16/10 707/704 |
| 2013/0117654 | A1 | 5/2013 | Rosner |
| 2013/0166521 | A1 * | 6/2013 | Ghatty ................ G06F 11/1469 707/695 |
| 2013/0297697 | A1 | 11/2013 | Haimovitch et al. |
| 2013/0311422 | A1 | 11/2013 | Walker et al. |
| 2014/0006458 | A1 | 1/2014 | Hsieh et al. |
| 2014/0149353 | A1 | 5/2014 | Lee et al. |
| 2015/0067088 | A1 | 3/2015 | Guerin et al. |
| 2015/0081810 | A1 | 3/2015 | Christianto et al. |
| 2015/0130630 | A1 * | 5/2015 | Outwater .............. H04L 9/3263 340/870.02 |
| 2015/0172412 | A1 | 6/2015 | Escriva et al. |
| 2015/0213109 | A1 | 7/2015 | Kassko et al. |
| 2015/0317349 | A1 | 11/2015 | Chao et al. |
| 2016/0110109 | A1 | 4/2016 | Cowling et al. |
| 2016/0147811 | A1 | 5/2016 | Eluri et al. |
| 2016/0179850 | A1 | 6/2016 | Martin et al. |
| 2016/0210228 | A1 | 7/2016 | Tandel |
| 2017/0132429 | A1 * | 5/2017 | Bell ...................... H04L 9/0861 |
| 2017/0185625 | A1 | 6/2017 | Cheru et al. |
| 2017/0193031 | A1 | 7/2017 | Papapanagiotou et al. |
| 2017/0206231 | A1 | 7/2017 | Binder et al. |
| 2017/0220617 | A1 | 8/2017 | Bortnikov et al. |
| 2017/0371912 | A1 | 12/2017 | Kimura |
| 2018/0218022 | A1 | 8/2018 | Mace et al. |
| 2018/0225051 | A1 | 8/2018 | Vansa |
| 2018/0276223 | A1 * | 9/2018 | Dhanasekaran ...... G06F 16/125 |
| 2019/0050429 | A1 | 2/2019 | Parayatham et al. |

FOREIGN PATENT DOCUMENTS

| | | |
|---|---|---|
| WO | 2013019888 A1 | 2/2013 |
| WO | 2014008495 A2 | 1/2014 |

OTHER PUBLICATIONS

Krzyzanowski, Paul et al., "Distributed Systems 20. Spanner," Nov. 21, 2016, 14 pages <https://www.cs.rutgers.edu/~pxk/417/notes/content/20-spanner-slides.pdf>.

Murat, "Spanner: Google's Globally-Distributed Database" Jul. 4, 2013, 5 pages <http://muratbuffalo.blogspot.in/2013/07/spanner-googles-globally-distributed_4.html>.

Rystsov, Denis, "Visualization of serializable cross shard client-side transactions," Mar. 2, 2016, 5 pages <http://rystsov.info/2016/03/02-cross-shard-txs.html>.

International Preliminary Report on Patentability, PCT/US2018/035921, dated Mar. 5, 2020 (8 pages).

Ho, Ricky, "Everything You Need to Know About Couchbase Architecture," Database Zone, Jul. 12, 2012, 23 pages.

International Search Report and Written Opinion, PCT/US2018/035921, dated Aug. 27, 2018, p. 1-14.

Dragojevic, A., et al., FaRM: Fast Remote Memory, Paper of the Proceedings of the 11th USENIX Symposium on Networked Systems Design and Implementation, Apr. 2-4, 2014, p. 400-414, Seattle, WA, https://www.usenix.org/conference/nsdi14/technical-sessions/dragojevic.

Gao, et al., Application Specific Data Replication for Edge Services, Paper, May 20-24, 2003, p. 1-16, Budapest, Hungaryb http://www2003.org/cdrom/papers/refereed/p669/www03_xhtml/lead.html.

Goel, S. et al., Data Replication Strategies In Wide Area Distributed Systems, Paper, 2006, p. 1-27, The University of Melbourne, Australia, http://www.cloudbus.org/papers/DataReplicationInDSChapter2006.pdf.

Haapasalo, T., et al., Concurrent Updating Transactions on Versioned Data, Paper, Sep. 16-18, 2009, p. 77-87, Finland.

Katsov, I., Distributed Algorithms in NoSQL Databases, Highly Scalable Blog, Date Accessed Oct. 12, 2016, p. 1-18, https://highlyscalable.wordpress.com/2012/09/18/distributed-algorithms-in-nosql-databases/.

Taherimonfared, A., et al., Real-Time Handling of Network monitoring Data Using a Data-Intensive Framework, Paper, 2013, p. 258-265, IEEE International Conference on Cloud Computing Technology and Science.

Wei, X., et al., Fast In-Memory Transaction Processing Using RDMA and HTM, Shanghai Jiao Tong University Paper, Oct. 4-7, 2015, p. 1-18 Monterey, CA.

Amazon Simple Storage Service Developer Guide, API Version, Mar. 1, 2006, p. 1-6, http://docs.aws.amazon.com/AmazonS3/latest/dev/mpuoverview.html.

Kaur et al., "Concurrency Control in Distributed Database System," International Journal of Advanced Research in Computer Science and Software Engineering, vol. 3, Issue 7, Jul. 2013 (5 pages).

Tracy, "Serializable, Lockless, Distributed: Isolation in CockroachDB," May 4, 2016 (10 pages).

* cited by examiner

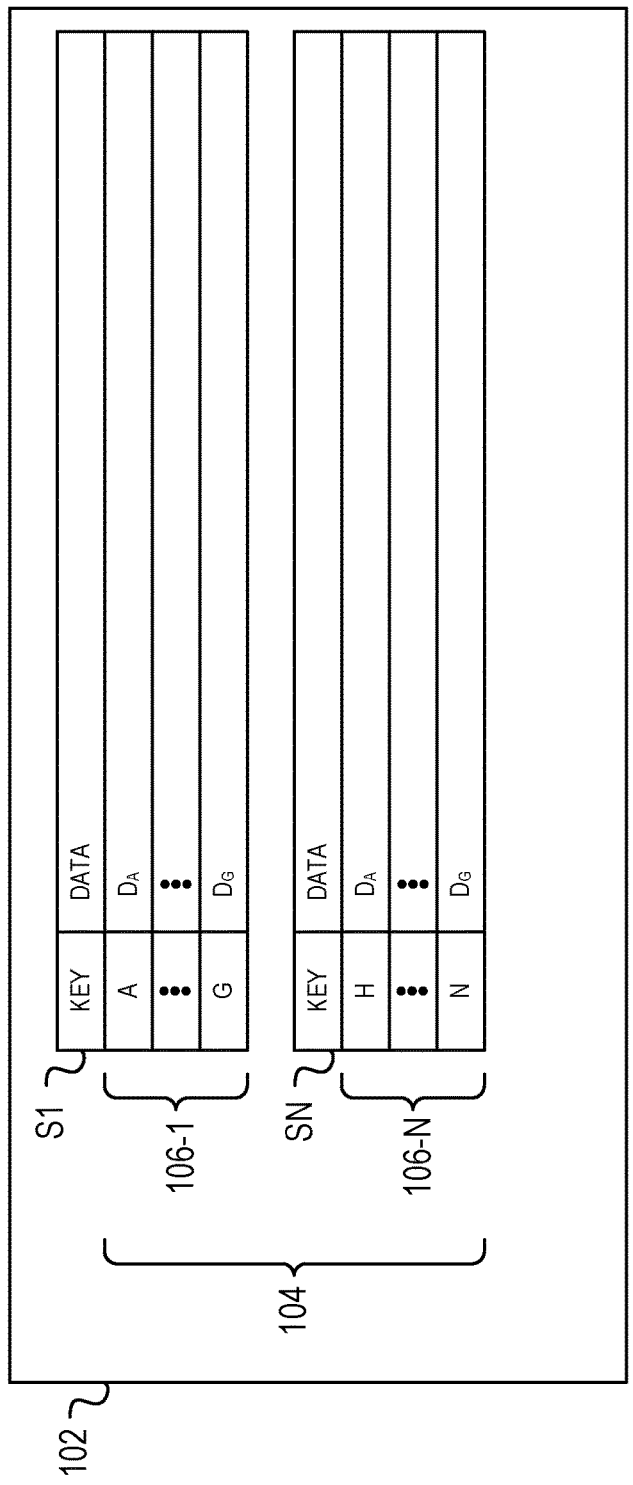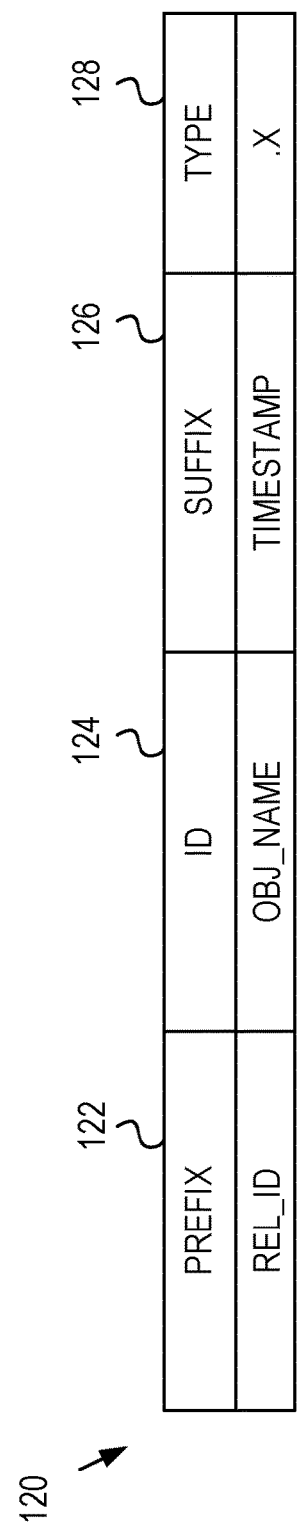
FIG. 1A
FIG. 1B

KEY DATA STORE GARBAGE COLLECTION AND MULTIPART OBJECT MANAGEMENT

TECHNICAL FIELD

The present disclosure generally relates to data storage using a key ticketing system, and in a more particular non-limiting example, efficient garbage collection and multipart object management.

BACKGROUND

The rise in electronic and digital device technology has rapidly changed the way society communicates, interacts, and consumes goods and services. Digital technology enables a variety of electronic devices to be available that can be used for a variety of purposes and are relatively cheap. Specifically, modern electronic devices, such as desktop computers, laptops, smart phones, and tablets, allow a user to have continuous access to a variety of useful applications. Using such applications results in the generation of an increasingly large amount of data. Storing and retrieving the produced data efficiently is a significant challenge.

Some solutions use a metadata database (DB) or a key value store (KVS) in a decision support system (DSS) to provide scalability in an attempt to accommodate the current growth in data. These types of distributed DSSs generally require that high levels of consistency be maintained in the metadata DB or KVS with a minimal impact on the responsiveness.

In such systems, as a data object is manipulated over time, key entries for those data manipulation operations are stored in association with the object, which results in earlier key entries for that object often becoming outdated. However, these current systems are generally unable to provide for timely and computationally efficient removal of obsolete key entries from such key stores (which are constantly receiving and processing requests, and often store millions of entries or more), thus resulting in increasing data bloat and significant computational overhead. This problem is further exacerbated when large data objects are added using a multipart uploading process, which can result in the generation of numerous corresponding key entries for the corresponding object parts that can become unwieldy to maintain.

Accordingly, an improved garbage collection process is desired that can garbage collect entries from an ordered key data store. Additionally, an efficient multipart data storage service that is capable of effectively utilizing the ordered key data store is desired.

SUMMARY

The present disclosure generally relates to novel garbage collection and multipart object management technology that is efficient, supports multipart object uploading, and provides data consistency.

According to one innovative aspect, a computer-implemented method comprises initializing garbage collection of obsolete key entries stored in a key data store, the key data store storing an ordered set of key entries and evaluating a key entry in the ordered set of key entries that is associated with a first data object. The key entry associated with the first data object comprises a key containing an object identifier associated with the first data object, operation type identifying an operation associated with the first data object, and an inverse timestamp associated with the operation and the first data object. The method further comprises determining, based on the operation type, that the operation associated with the first data object is a delete operation, and responsive to determining that the operation is a delete operation, determining, based on a garbage collection criterion, whether to remove the key entry associated with the first data object from the ordered set of key entries of the key data store or retain the key entry in the ordered set of key entries.

According to another innovative aspect, a computer-implemented method comprises initializing garbage collection of obsolete key entries stored in a key data store and evaluating a key entry in the ordered set of key entries that is associated with a first data object. The key data store stores an ordered set of key entries. The key entry associated with the first data object comprises a key containing an object identifier associated with the first data object, operation type identifying an operation associated with the first data object, and an inverse timestamp associated with the operation and the first data object. The method further comprises determining, based on the operation type in the key, that the operation associated with the first data object is one of a read operation and a write operation, and responsive to determining that the operation associated with the first data object is one of a read operation and a write operation, retaining the key entry associated with the first data object in the ordered set of key entries of the key data store.

According to another innovative aspect, a computer-implemented method comprises determining that a multipart upload request to upload a data object in separate object parts has been received by an object storage service; generating temporary keys for the separate object parts of the data object; storing the temporary keys in a temporary key data store; generating, based on the temporary keys, a multipart key entry for the data object, the multipart key entry comprising a multipart key that contains an object identifier identifying the data object and an inverse timestamp; and inserting the multipart key entry in a persistent key data store storing an ordered set of key entries in a position determined by the object identifier and the inverse timestamp.

According to another innovative aspect, a storage system comprises one or more processors and one or more memories coupled to the one or more processors. The one or more memories store instructions that, when executed by the one or more processors, perform operations comprising: initializing garbage collection of obsolete key entries stored in a key data store and evaluating a key entry in the ordered set of key entries that is associated with a first data object. The key data store stores an ordered set of key entries and the key entry associated with the first data object comprises a key containing an object identifier associated with the first data object, operation type identifying an operation associated with the first data object, and an inverse timestamp associated with the operation and the first data object. The operations further comprise determining, based on the operation type, that the operation associated with the first data object is a delete operation, and responsive to determining that the operation is a delete operation, determining, based on a garbage collection criterion, whether to remove the key entry associated with the first data object from the ordered set of key entries of the key data store or retain the key entry in the ordered set of key entries.

According to another innovative aspect, a storage system comprises means for initializing garbage collection of obsolete key entries stored in a key data store; means for evaluating a key entry in an ordered set of key entries that is associated with a first data object; means for determining, based on an operation type in a key, that an operation associated with the first data object is one of a read operation and a write operation; and means for retaining, responsive to determining that the operation associated with the first data object is one of a read operation and a write operation, the key entry associated with the first data object in the ordered set of key entries of the key data store. The key data store stores an ordered set of key entries and the key entry associated with the first data object comprises the key containing the object identifier associated with the first data object, operation type identifying the operation associated with the first data object, and an inverse timestamp associated with the operation and the first data object.

These and other implementations may optionally include one or more of the following features: determining a difference between a current inverse timestamp and the inverse timestamp contained in the key of the key entry; determining that the difference satisfies a garbage collection threshold; removing the key entry associated with the first data object from the ordered set of key entries of the key data store; determining a difference between a current inverse timestamp and the inverse timestamp contained in the key of the key entry; determining that the difference does not satisfy a garbage collection threshold; and retaining the key entry that is associated with the first data object in the ordered set of key entries; evaluating one or more next key entries relative to the key entry; determining that an object identifier from each of the one or more next key entries references the first data object; removing the one or more next key entries from the ordered set of key entries of the key data store; that the one or more next key entries are ordered sequentially immediately after the key entry in the key data store; that the ordered set of key entries is ordered alphanumerically; that the garbage collection criterion is based on an upload window of a write operation; that the key entry is the most-recent key entry for the first data object in the ordered set of keys in the key data store; evaluating one or more next key entries relative to the key entry; determining that an object identifier from each of the one or more next key entries references the first data object; removing the one or more next key entries from the ordered set of key entries of the key data store; evaluating a next key entry relative to the key entry in the ordered set of key entries; determining that an object identifier from a key of the next key entry references a different data object than the first data object; determining that a delete operation is specified by an operation type from the key of the next key entry; responsive to determining that the delete operation is specified by the operation type from the key of the next key entry, determining, based on a garbage collection criterion, whether to remove the key entry associated with the first data object from the ordered set of key entries of the key data store or retain the key entry in the ordered set of key entries; that generating temporary keys for the separate object parts comprises generating, for each object part from the separate object parts, a part key containing a part key identifier identifying the object part and an inverse timestamp associated with the upload of the data object; that the part key of each object part indicates a sequential part number for the object part; that generating the temporary keys further comprises allocating memory for storing the temporary keys; storing the temporary keys in the memory while the separate object parts are being uploaded determining that the separate object parts have been uploaded; that storing the temporary keys comprises copying the temporary keys from the memory to the temporary key data store; deleting temporary keys from the memory; releasing the memory; that the multipart key further contains an operation type that represents a multipart-based data manipulation operation; that the position of the multipart key entry is further determined based on the operation type contained in the multipart key; and deleting temporary keys for the separate object parts from the temporary key data store.

Other aspects include corresponding methods, systems, apparatus, and computer program products for these and other innovative aspects.

It should be understood, however, that the above list of features is not all-inclusive and many additional features and advantages, such as but not limited to those discussed below, are contemplated and fall within the scope of the present disclosure. Moreover, it should be understood that the language used in the present disclosure has been principally selected for readability and instructional purposes, and not to limit the scope of the subject matter disclosed herein.

BRIEF DESCRIPTION OF THE DRAWINGS

The present disclosure is illustrated by way of example, and not by way of limitation in the figures of the accompanying drawings in which like reference numerals are used to refer to similar elements.

FIG. 1A is a diagram illustrating an example key data store.

FIG. 1B is a diagram of an example object key naming structure.

DETAILED DESCRIPTION

Figure 1C:
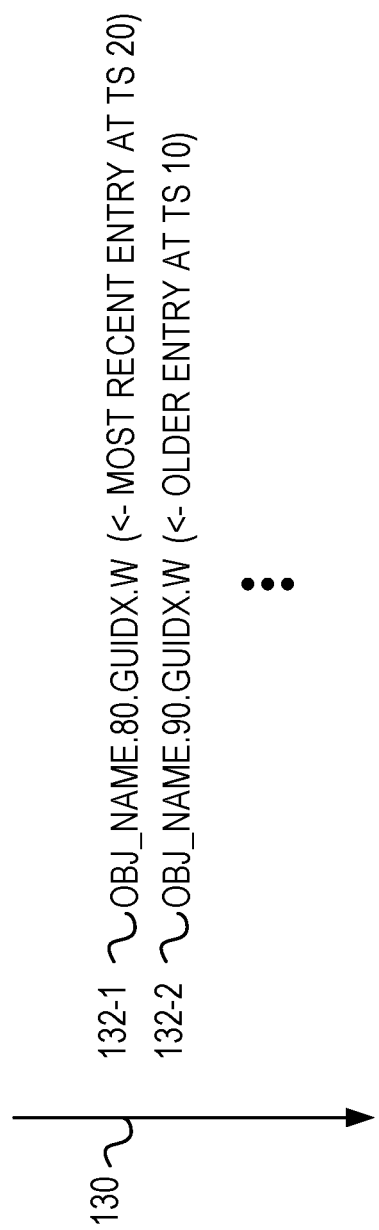
FIG. 1C is a diagram showing an example ordered set of object key entries.

The present disclosure describes a novel garbage collection and multipart object management technology, which may include methods, systems, apparatuses, computer program products, and other aspects, that enables more efficient garbage collection and multipart uploading in a data storage system (e.g., which includes databases that store data objects and associated key entries in a key-value store (KVS)). The technology is advantageously scalable, allows garbage collection to take place in a single pass in some cases, and limits key proliferation responsive to a multipart object upload.

As a non-limiting overview, the technology can store key entries in a database system in a novel, ordered way that improves data space usage and responsiveness when processing storage operations (e.g., read and write requests). The key data store supports a plurality of storage operations, such as but not limited to, put, get, delete, list, etc., and stores entries representing various data manipulation operations performed on objects, such as standard data manipulation operations (e.g., read, write, delete, modify, etc.). In some embodiments, the key data store may be sharded or distributed.

As operation requests are received, the total number of stored key entries grows. Some operation requests result in updates to currently stored data object, rendering at least some of the previously received key entries for that data object obsolete. Similarly, a user may request that a given data object be deleted, which could make further storage of that data object and any associated key entries unnecessary. In response, the data storage system can periodically garbage collect unwanted or outdated key entries by leveraging the ordered nature of the key data store. In some cases, the garbage collection can advantageously be completed in a single pass, which reduces overhead in maintaining the key data store, and results in the more efficient use of use space and increased responsiveness.

FIG. 1A is a diagram illustrating an example key data store 102, which comprises a plurality of shards from S1 ... SN. While two shards (S1 and SN) are shown, it should be understood that any suitable number of shards may be included. Each shard stores an ordered subset of object key entries. For example, shard S1 is shown as storing the subset of object key entries 106-1 (e.g., keys A-G) and shard SN is shown as storing the subset of object key entries 106-N (e.g., keys H-N). The subsets 106-1 through 106-N comprise the ordered set of object key entries 104.

Further, as shown in FIG. 1A, each key (e.g., A ... N, etc.) can correspond to a data instance (e.g., $D_A \ldots D_N$). The data instance may comprise a pointer to a location where the actual object data is stored (e.g., in a separate database, on a physical drive, etc.), or other suitable data values. Each key corresponds to a particular object. Further, various subsets of object key entries may correspond to the same object at different points in time. In such a configuration, an ordered set of object key entries can be stored across shards that can be efficiently searched. Further, storage of the actual data may be performed in accordance with various considerations such as data location, availability, and cost.

A key (also referred to as an object key) may be generated using an object key naming structure. FIG. 1B is a diagram of an example object key naming structure 120. As shown, a key may comprise a combination of a plurality of key components, such as, but not limited to, an object identifier and an inverse time value. More particularly, as shown, example components include a prefix 122, an object ID 124, a suffix 126, and a type 128, although it should be understood that other dimensions are possible and contemplated, and could vary based on implementation.

The prefix 122 may comprise an identifier for identifying a group of object key entries from the ordered set of object key entries that are logically related. For example, the prefix may include a domain identifier, a bucket identifier, a client identifier, or any suitable combination thereof. In this way, a given client's object keys can be grouped together. Any suitable number of prefixes may be included in an object key.

The object identifier (ID) 124 may comprise a unique identifier for the object to which the key corresponds, such as an object name. An example object identifier may comprise a unique character string (e.g., a file identifier, a file name, etc.) that is auto-generated and/or user-defined, and used for storing the object or file in an object storage, although other suitable data constructs that can uniquely identify objects are also encompassed.

The suffix 126 may comprise a ticket value for ordering different object keys associated with a particular object. The ticket value (also simply called ticket in some embodiments) may be an inverse timestamp. As discussed further herein, an inverse timestamp is calculated by determining the difference between an operation timestamp associated with the object key (e.g., local timestamp) and a reference timestamp value). As time passes, the value of the inverse timestamp generally decreases. As such, two sequential operations associated with the same object are recorded in the key data store in inverse order, with the most-recent operation being represented first (ahead of the less recent operation).

Additional suffix(es) may be appended, such as, but not limited to, an operation type, such as type 128. The type 128 may comprise an identifier of the type of object storage operation that is represented by the object key. In some embodiments, a given operation may be denoted by a corresponding value, such as, but not limited to, unique character or character string, and the type 128 may include that value. Example object storage operations include read, write, delete, update, etc. As a further example, write and update operations may be represented by a given identifier (e.g., "W"), a delete operation may be represented a given identifier (e.g., "K"), etc., and so forth. While in some example embodiments, write and update operations may be recorded as the same type of operation, in further embodiments they may be differentiated.

FIG. 1C is a diagram showing an example ordered set of object key entries 130. As shown, the ordered set 130 includes two keys 132-1 and 132-2 representing two sequential write operations. In this example, key 132-1 includes an operation timestamp of 20 milliseconds, the key 132-2 includes an operation timestamp of 10 milliseconds, and the ticketing technology uses an example reference timestamp of 100 milliseconds. It should be understood that the timestamp values used are provided by way of example to make the examples provided herein clear, and any suitable timestamps may apply, such as a portable operation system interface (POSIX) timestamp, a 1900 date system timestamp, derivations there, and/or any other suitable convention for tracking time. Further, as a matter-of-course, the value of the reference timestamp is often chosen to have a value that is larger than the expected service life of the key data store.

Using the reference timestamp, the ticketing technology determines an inverse timestamp for each of the operations. As the operation timestamps increase with the passage of time, the computed inverse timestamps decrease for the operations executed over time. For instance, an inverse timestamp for a given operation is calculated by determining the difference between the operation timestamp and the reference timestamp. In particular, continuing the above example, for key 132-1, the inverse timestamp is 80 (100−20=80), and for write operation 132-N, the inverse timestamp is 90 (100−10=90).

By ordering the key entries in the key data store (and the operations embodied thereby) relating to the same data object using at least the inverse timestamps, subsequent operations relating to that data object are arranged in entries in the ordered key data store with the most-recent operation being represented first. For instance, as shown in FIG. 1C, key 132-2, which represents an operation having an inverse timestamp of 90, is older than key 132-1, which represents a more recent operation having a timestamp of 80. As a result, a key entry comprising key 132-1 is ordered ahead of a key entry comprising key 132-2 in the ordered set 130 because key 132-1's inverse timestamp is lower (80 versus 90).

By way of further example, during a subsequent query, retrieval of the most-recent entry from the ordered set of object key entries (e.g., in this example, the entry comprising key 132-1) can be performed efficiently (e.g., by the key data store controller 320, see FIG. 3) because retrieval of the first entry in the ordered set for a given object (e.g., OBJ_NAME) does not require iteration through entries associated with that object. Rather, by way of illustration, such a retrieval may consume equivalent computational resources as that of an exact lookup of a single key for that object.

Versioning of an object includes the tracking and preservation of more than one version of the object as the object changes over time and allows for the archival of the different versions of the object as they occur over time (e.g., due to modifications made over time to the object), retrieval of a prior version of the object, and/or recovery from unintended overwrites and/or deletions made to the object.

Advantageously, using the inverse timestamps as suffixes allows versioning of an object to be achieved in a scalable way without impacting performance of single key read operations, and without impacting the design or configurations of the key data store and/or its shards. The ticketing technology can also provide for lock-free concurrency. As discussed further below, the ticketing technology may do so by including a suffix in the key that identifies the particular client making the object storage request. The key's client identifier advantageously allows the ticketing technology to handle concurrent object storage requests of different clients, which are issued at exactly the same time, without having to revert to performance reducing lock mechanisms.

Figure 2:
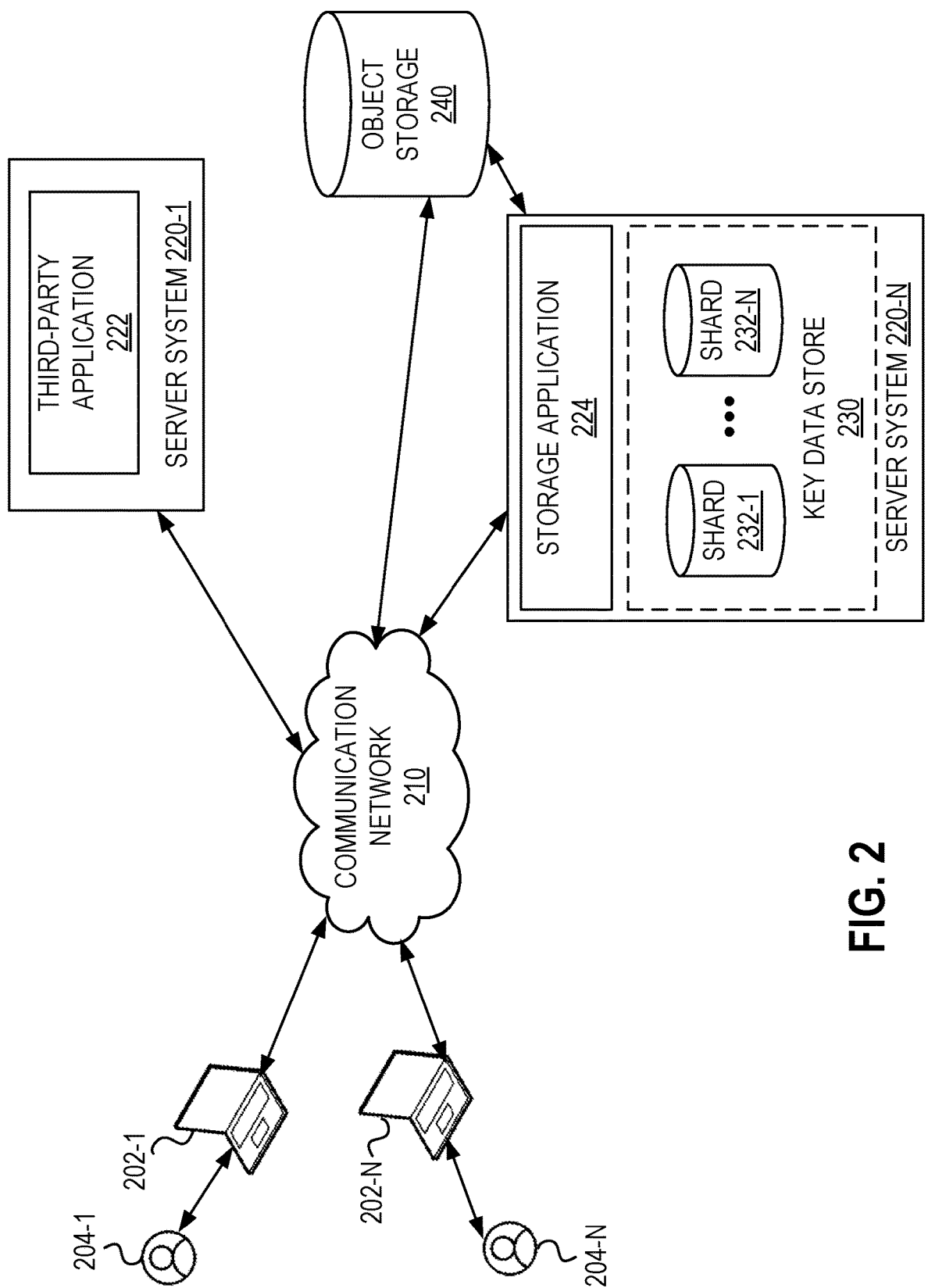
FIG. 2 is a block diagram of an example key ticketing system.

The key data store may be implemented a distributed environment, such as the client-server key ticketing system 200 depicted in FIG. 2. As shown, the system 200 can include client systems (e.g., client systems 202-1 and 202-N), server systems (e.g., server systems 220-1 and 220-N), a key data store 230, and an object storage 240. These components 202, 220, 230, and/or 240 may be interconnected via a communication network 210. For simplicity in some cases, depending on context, the client systems 202-1 and 202-N may also be referred to herein individually or collectively as client system 202 or client 202, and the server systems 220-1 and 220-N may be referred to herein individually or collectively as server system 220 or server 220.

The communication network 210 may include any number of private and public computer networks. The communication network 210 include network(s) having any of a variety of network types, including local area networks (LANs), wide area networks (WANs), wireless networks, virtual private networks, wired networks, the Internet, personal area networks (PANs), object buses, computer buses, and/or a combination of any suitable communication mediums via which devices may communicate in a secure or insecure fashion.

Data may be transmitted via the network 210 using any suitable protocol. Example protocols include, but are not limited to, transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other suitable protocols.

A client system may comprise an electronic computing device, such as a personal computer (PC), a laptop, a smartphone, a tablet, a mobile phone, a wearable electronic device, server, server appliance, or any other electronic device or computing system capable of communication with the communication network 210. The client system 202 may store one or more client applications in non-transitory memory. A client application may be executable by a computer processor of the client system 202. In some example embodiments, a client application includes one or more applications such as, but not limited to, data storage applications, search applications, communication applications, productivity applications, game applications, word processing applications, or any other useful applications. A client application may include a web browser and/or code executable thereby in some cases. In some embodiments, a client system 202 may include an application for creating, modifying, and deleting objects, which may be stored in the object storage 240. For instance, the application may be specifically customized for communication with the third-party application(s) 222 and/or storage application 224, such as an application adapted to configure and/or utilize programming interfaces of the storage application 224. In some embodiments, the third-party application(s) 222 hosted by the server system 220-1 may embody a client of the storage application 224, as it may access the functions of the storage application 224 using various programmatic interfaces surfaced thereby (e.g., to create, store, retrieve, delete, etc., objects stored in the object storage).

The client systems 202 and/or server systems 220 may send/receive requests and/or send/receive responses, such as but not limited to HTTP(S) requests/responses, to/from one another. A client system 202 may present information, such as visual, audio, tactile, and/or other information via output devices, such as displays, audio reproduction devices, vibration mechanism, etc., based on information generated by client system 202 and/or received from a server system 220.

Users may interact with various client systems 202 to provide input and receive information. For instance, as illustrated, users 204-1 and 204-N may interact with client systems 202-1 and 202-N by utilizing the operating system and/or various applications executing on the client systems 202-1 and 202-N.

In some embodiments, a client application (e.g., a client application executing on a client system 202, the third-party application(s) 222, etc.) may send a request (also referred to as an object storage request) to the server system 220 to store, update, delete, or retrieve a particular file stored at the server system 220-N through the communication network 210. For example, a user 204 may update a document using a word processing application and may save the updated version to the server system 220-N, in which case the word processing application transmits a request to the storage application 224 to store the updates.

The object storage request may include information describing the object being updated, such as a file name, the data comprising the updates, a client identifier, an operation type, etc., and the storage application 224 may use that information to record the updates, as described herein. In another example, a client application (e.g., an application executing on a client system 202, the third-party application 222, etc.) may request a data object or portion thereof, a list of data objects matching certain criteria, etc., in which case the request may include corresponding information (e.g., an object identifier, search criteria (e.g., time/date, keywords, etc.), and receive an object list or the object itself from the storage application 224. Numerous other use cases are also applicable and contemplated.

As shown in FIG. 2, the server system 220-N may include a storage application 224 and may be coupled to and/or include a key data store 230. The storage application 224 may include components that perform various tasks, as discussed with reference to at least FIG. 3. The storage applications 224, and/or its components, may be coupled for communication to one another and other components of the system, such as the key data store 230, the object storage 240, an application executing on a client system 202, the third-party application 222, etc.

The storage application 224 may provide an object storage service, manage data storage using the key data store 230 and the object storage 240 (e.g., store, retrieve, and/or other manipulate data in the key data store 230, retrieve data objects from the object storage 240, etc.), process requests received from various entities (e.g., client systems 202, server systems 220, local application, etc.), provide for lock-free concurrency, perform garbage collection, and perform other acts, as discussed further herein. The storage application 224 may include various interfaces, such software and/or hardware interfaces (e.g., application programming interface(s) (API(s)), that may be accessed (e.g., locally, remotely, etc.) by components of the system 200, such as various client applications, the third-party application 222, etc.

In some embodiments, the storage application 224 may be a distributed application that is implemented in two or more computing systems. In some embodiments, the object storage 240 may comprise a plurality of storage devices, servers, software applications, and other components, such as but not limited to any suitable enterprise data grade storage hardware and software. Similarly, while FIG. 2 shows the key data store 230 as residing on a single server, it should be understood that the key data store 230 may be distributed across two or more computing systems, such as server systems 220. In some embodiments, the storage application 224 may be a local application receiving local and/or remote storage requests from other clients (e.g., local applications, remote applications, etc.).

The key data store 230 may comprise a database that stores an ordered set of object key entries, as discussed in further detail elsewhere herein. In some embodiments, the key data store 230 may comprise a horizontally partitioned database having two or more shards 232-1 . . . 232-N, although other suitable database configurations are also possible and contemplated. As horizontal partitioning is a database design principle whereby rows of a database table are held separately, rather than being split into columns (which is what normalization and vertical partitioning do, to differing extents), each partition can form part of a shard, which may in turn be located on a separate database server or physical location. Thus, depending on the configuration, database shards may be implemented on different physical storage devices, as virtual partitions on the same physical storage device, or as any combination thereof. As noted above, the key data store 230 may comprise a plurality of duplicate copies of the ordered set of ordered key entries at a plurality of database locations.

The server system 220-N may be coupled to and/or include an object storage 240. The object storage 240 comprises one or more data stores for storing data objects. The object store 240 may implemented across a plurality of physical storage devices. In some example embodiments, the plurality of physical storage devices may be located at disparate locations. Data objects stored in the object storage 240 may be referenced by object key entries stored in the key data store 230. In some example embodiments, multiple copies of a given object or portions thereof (e.g., erasure-encoded copies) can be stored at different physical storage devices to protect against data loss through system failure or to have the object quickly accessible from different geographic locations.

The key data store 230 and/or the object storage 240 may be included in the server system 220-N or in another computing system and/or storage system distinct from but coupled to or accessible by the server system 220-N. The key data store 230 and/or the object storage 240 include one or more non-transitory computer-readable mediums (e.g., such as those discussed with reference to the memor(ies) 304 in FIG. 3) for storing the data. In some embodiments, the key data store 230 and/or the object storage 240 may be incorporated with the memor(ies) 304 or may be distinct therefrom. In some embodiments, key data store 230 and/or the object storage 240 may store data associated with a database management system (DBMS), such as one comprised by and/or controlled by the storage application 224 (e.g., the key data store controller 320, the storage service 322, etc., see FIG. 3) and/or other components of the system 200. In some instances, the DBMS may store data in multi-dimensional tables comprised of rows and columns, and manipulate, e.g., insert, query, update and/or delete, rows of data using programmatic operations, although other suitable DBMS configurations are also applicable.

It should be understood that the system 200 illustrated in FIG. 2 is representative of an example system, and that a variety of different system environments and configurations are contemplated and are within the scope of the present disclosure. For instance, in some further embodiments, various functionality may be moved between servers, from a server to a client, or vice versa, modules may be combined and/or segmented into further components, data may be consolidated into a single data store or further segmented into additional data stores, and some embodiments may include additional or fewer computing devices, services, and/or networks, and may implement various functionality client or server-side. Further, various entities of the system 200 may be integrated into a single computing device or system or additional computing devices or systems, etc.

Figure 3:
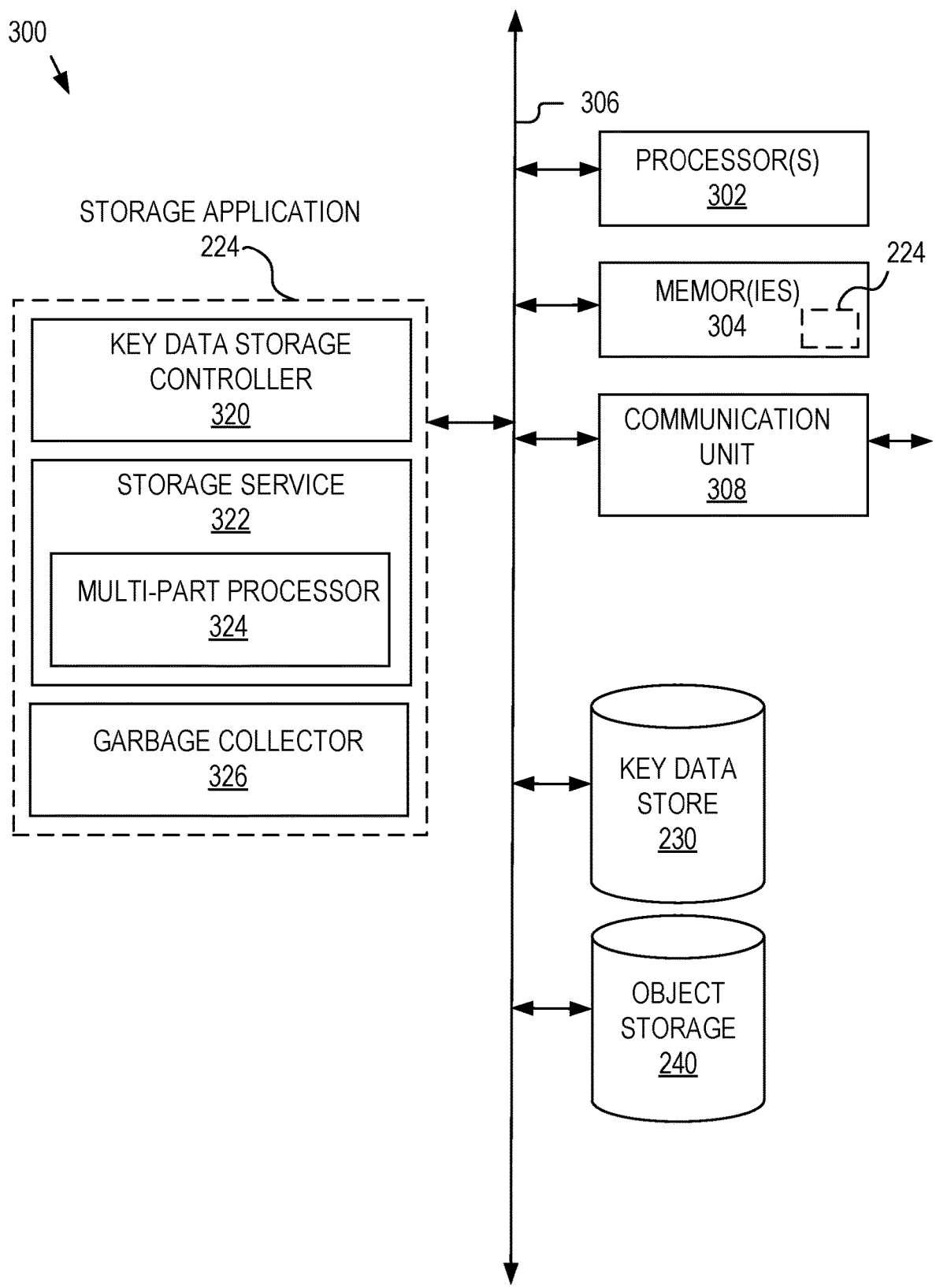
FIG. 3 is a block diagram of an example computing system.

FIG. 3 is a block diagram of an example computing system 300. In some embodiments, the computing system 300 may represent a server instance or collection of instances, such as the server system 220-N. In some embodiments, the computing system 300 may reflect other computing systems, such as a client system 202, a dedicated storage system, etc. The computing system 300 may comprise and/or be coupled to one or more processors 302, one or more memories 304, one or more communication units 308, a key data store 230, and an object storage 240. The computing system 300 further includes an instance of the storage application 224. The components of the computing system 300 can be communicatively coupled by a bus 306. In some embodiments, the key data store 230 and/or the object storage 240 may be implemented in a separate computing system and may be coupled to the computing system 300 via the communication unit 308. In such embodiments, the storage application 224, or aspects thereof, may be implemented in the separate computing system (e.g., as a distributed or local application, etc.)

As shown in FIG. 3, the storage application 224 includes a key data store controller 320, a storage service 322, and a garbage collector 326, although it should be understood that the depicted storage application 224 architecture is provided by way of illustration, and that the storage application 224 may include other components and/or include other component hierarchies, and/or that the foregoing components and/or their acts and/or functionality may be combined or segmented into further components, etc.

The storage application 224, and/or its sub-components, such as, but not limited to, the key data store controller 320, the storage service 322, and/or the garbage collector 326 may be implemented in hardware and/or software. For instance, the storage application 224, and/or one or more of its sub-components, may include hardware and/or software logic executable by the computing system 300. In some embodiments, the storage application 224, and/or one or more of its sub-components, may comprise sets of instructions executable by the processor(s) 302 to provide their functionality. In some embodiments, the storage application 224, and/or one or more of its sub-components, are stored in the memor(ies) 304 of the computing system 300 and are accessible and executable by the processor(s) 302 to provide their functionality. In any of the foregoing embodiments, the storage application 224, and/or one or more of its sub-components, may be adapted for cooperation and communication with the processor(s) 302 and other components of the computing system 300.

In further embodiments, the storage application 224, and/or one or more of its sub-components, may include specially configured software stored in the memor(ies) 304 and executable by the processor(s) 302 so as to configure the processor(s) 302. In some embodiments, the storage application 224, and/or one or more of its sub-components, may include logic gates, switches, application specific integrated circuitry (ASIC), a programmable logic controller, an embedded microcontroller, and/or other suitable hardware, etc. In further embodiments, the storage application 224, and/or one or more of its sub-components, may include both hardware and software aspects. Numerous further variations are also possible and contemplated.

It should be appreciated that computing system 300 may represent a single computing system, a plurality of computing systems connected over a wide geographic area, a server cluster, or other suitable computing configurations. Thus, while the structure, acts, and functionality of computing system 300 may be described in the singular for clarity, it should be understood that the description is applicable to and includes more simple or complex computing infrastructure.

The key data store controller 320 comprises logic executable to manage the key data store 230. For instance, the key data store controller 320 maintains the integrity of the ordered set of object key entries, generates new object keys, stores new entries, retrieves existing entries, and manages concurrency, etc.

The key data store controller 320 can maintain the entries stored in the key data store 230 as an ordered set of object key entries. As discussed elsewhere herein, such as with reference to FIGS. 1A-1C, the ordered set of object key entries may first group the entries using at least an object identifier component of the key, and then group the entries corresponding to each name in order of most recent to least recent using an inverse time component of each of the keys. Additionally, entries may further be grouped in the ordered set of object key entries using further key components, such as one or more additional prefixes preceding the object name/identifier. One or more suffixes following the inverse timestamp component may be used to determine characteristics about the operation represented by the entry and/or further distinguish the key from other keys, for instance based on the application or device that executed the operation (e.g., client ID), the type of operation that was performed, and so forth.

In some example embodiments, keys may comprise alphanumeric character strings that include letters, numbers, and/or symbols (character symbols, punctuation, mathematical symbols, etc.), in which case the ordered set of object key entries may be sorted alphanumerically. For instance, referring to FIG. 1C, key 132-1 is first because the inverse timestamp of 80 comprising a portion of the character string of that key is lower than the inverse timestamp of 90 comprising a portion of the character string of the subsequent key of entry 132-2. However, it should be understood that configurations that reverse the sorting order and the inverse timestamps to achieve an objective equivalent to that as the ordered set of object key entries are encompassed hereby. Further, the keys may comprise other suitable constructs (e.g., encoded, compressed, etc.) that can be sorted in an analogous manner.

The key data store controller 320 stores entries in the key data store 230 reflecting data manipulation operations performed on objects (e.g., read, modify, write, etc.). Entries may be stored responsive to object storage requests received by the storage service 322, such as but not limited to, put, get, delete, list, etc. The storage service 322 may be coupled to the key data store controller 320 to instruct the key data store controller 320 to record the data manipulation operations. For example and not limitation, in a software embodiment, the storage service 322 can call corresponding methods of the key data store controller 320 configured to perform the various functions and acts described herein. An instruction received form the storage service 322 may comprise a new key entry request that includes components for generating the key, and in some embodiments, data corresponding to the key.

By way of example, when recording a write, update, delete, etc., operations, the key entry request received from the storage service 322 may include key-related data for generating the key, and a corresponding data instance (e.g., data value) for storage in association with the key. Responsive to receiving the storage instruction from the storage service 322, the key data store controller 320 computes an inverse timestamp using the key-related data, generates the key using the inverse timestamp, the object identifier, etc. (e.g., a prefix, an operation type, etc.), and stores a new entry comprising the generated key and the data instance in order of recency, as described elsewhere herein.

Continuing the foregoing example, the key data store controller 320 can determine the inverse timestamp using an operation timestamp and a reference timestamp by determining a difference between the operation timestamp and the reference timestamp (e.g., subtracting the operation timestamp from the reference timestamp), as discussed elsewhere herein. The operation timestamp may be included in the instruction data or may be determined by the key data store controller 320 (e.g., using a clock of the local system, issuing a call to the operating system, etc.). For instance, the object storage request received and processed by the storage service 322 includes a timestamp determined by the requesting computing system upon which the request was initiated (e.g., a client system 202, server system 220-1, etc.). In this case, the local operation timestamp may reflect the point in time in which the object storage operation was initiated (e.g., based on a clock of that system). In another example, the key data store controller 320 assigns a timestamp to a requested object storage request based on the clock at the server system 220. Other suitable variations may also apply.

In the foregoing example, the new entry is situated first for that object (relative to other existing entries) in the ordered set of object key entries since it is the most recent based on the inverse timestamp. However, as further operations are performed on the object, as discussed elsewhere herein, corresponding further entries are added to the key data store 230 and the foregoing new entry becomes less recent. This advantageously allows for scalable and flexible versioning of a data object.

An operation type component included in the key generated by the key data store controller 320 may reflect the operation performed on the object, and may be used to record the lifecycle of the object over time (when it was initially created, modified, deleted, etc.).

As another example, when performing a read operation (e.g., responsive to receipt of a list request), the instruction data received from the storage service 322 may include key-related search terms that are used for querying the key data store 230. For example, the search term(s) may comprise an object identifier or portion thereof, and the key data store controller 320 may query the ordered set of object key entries in key data store 230 based on the object identifier (or portion thereof) and return a corresponding result set. Additional or alternative search term(s) may include, but are not limited to, data describing a domain, bucket, timestamp, operation type, etc., and the key data store controller 320 may query the ordered set of object key entries in the key data store 230 based on them and return a corresponding result set.

In some cases, the result set may be ordered in inverse order beginning with the most-recent entry first and the oldest entry last, which mirrors the order in the ordered set of object key entries of the key data store 230, although the result set could be ordered in other ways depending on implementation.

In some embodiments, further key components may be included in the instruction from the storage service 322 so the result set may be refined (e.g., limited to a certain client and/or operation type, etc.). In some cases, the most-recent entry for a particular object reflecting the most-recent data manipulation operation may be requested, in which case the result set may include a single result. Other variations are also possible and contemplated.

By way of further illustration, potential object storage operations may include, but are not limited to, adding an object to an object storage database (e.g., object storage 240 in FIG. 2), updating an object, or deleting or removing the object from the database. In some example embodiments, the object storage requests may be received from a client application (e.g., word processing application, spreadsheet application, photo editing application, any other application configured to manipulate objects, etc.).

In response to receiving an object storage request, the key data store controller 320 can generate an object key for the requested object storage operation. As discussed elsewhere herein, the object key is comprised of at least an object identifier of the object to which the requested object storage operation relates, and an inverse timestamp associated with the operation. In some embodiments, to compute the inverse timestamp, the key data store controller 320 can determine the difference between an operation timestamp and a reference timestamp.

As described elsewhere herein, the operation timestamp may reflect a local timestamp of the computing system involved with performing the operation (e.g., a client or server system that triggered the operation (e.g., responsive to a user input modifying an object, an automated procedure or program that modified the object, etc.), the server system implementing the operation (e.g., such as the server system hosting the storage application 224), etc. The reference timestamp may reflect a reference time value used to calculate the inverse timestamp, as described elsewhere herein. In some embodiments, the reference timestamp may be predetermined, stored in memory, and retrieved by the key data store controller 320 to perform the calculation. By way of further example, the inverse timestamp may be computed by subtracting the operation timestamp from the reference timestamp. For example, if the reference timestamp is 100 milliseconds and the operation timestamp is 65 milliseconds, the inverse timestamp would be equal to 100−65=35.

In some embodiments, when generating the object key, the key data store controller 320 can append the inverse timestamp to the object identifier as a suffix. For instance, an example object identifier may be Object1 and an example inverse timestamp may be 30, in which case at least a portion of the object key comprises a value combining Object1 and 30 (e.g., Object130, Object1_30, Object1.30, etc. In some cases, a delimiter may be used to separate the constituent components of the object key. The delimiter may comprise any suitable symbol or sequence of symbols. For example, the delimiter may comprise a period, in which case the foregoing example object key would be Object1.30. Continuing this example, a subsequent operation is performed on the object where the inverse timestamp is computed to be 20. In this case, the object key comprises Object1.20 as at least a part of its name, and when inserted into the key data store 230 (e.g., see block 406), would be positioned ahead of Object1.30 because of the difference between the inverse timestamp components (e.g., 20<30).

The object key can append one or more additional suffixes and prepend one or more additional prefixes to further differentiate between entries and/or sort/group entries, such as a domain identifier, bucket identifier, client identifier, operation type, etc., as discussed in further detail elsewhere herein. The sequence of the suffixes and prefixes can vary depending on further grouping and sorting needs in some cases, and may be delimited, as described elsewhere herein.

An object key entry inserted into the key data store 230 may comprise the generated object key and a corresponding data instance (e.g., value). The key data store controller 320 can index the data instance, query the data instance, and/or retrieve the data instance using the object key. By way of non-limiting example, the data instance may comprise a reference to a storage location of the object data instance in the object storage database. As an object is manipulated by the storage service 322 over time, the object is versioned by virtue of storing iterative object instances in the object storage database. Correspondingly, for each operation performed on the object, a corresponding entry is logged in the key data store 230 in reverse order based on the inverse timestamp. When the most-recent object key for a particular object is requested, the storage service 322 can efficiently retrieve the first object key entry that it encounters as it traverses the key data store 230 because that object key entry reflects the most-recent state/version of the object (reflects the most-recent operation performed on the object). The following is a further non-limiting example demonstrating the insertion of an object key entry into the key data store 230. In this simplified example, assume the ordered set of object key entries comprises at least the following sequence of object keys, where each key has the following naming structure [object identifier in quotes].[inverse timestamp].[operation type]:

"K1".90.W
"K2".80.W
"K2".90.W
"K3".80.W

"K3".90.W
"K4".70.K
"K4".80.W
"K4".90.W
"K5".70.W
"K5".80.W
"K5".90.W

If a new object key for object "K3" is added to the ordered set of object key entries, where the inverse timestamp of that key is 55, the ordered set of object key entries would then be as follows:

"K1".90.W
"K2".80.W
"K2".90.W
"K3".55.W
"K3".80.W
"K3".90.W
"K4".70.K
"K4".80.W
"K4".90.W
"K5".70.W
"K5".80.W
"K5".90.W

The storage service 322 comprises computer logic executable to process object storage requests. The storage service 322 may receive requests from local applications and/or remote applications. An application that sends storage requests to the storage application 224 is referred to herein as a client application. The storage service 322 can process the requests and transmit corresponding responses, which may include confirmation data confirming a successful execution of a storage-related operation, response data reflect results of a query-based request, and/or error information reflecting any errors that were encountered, etc. In further embodiments, the functionality of the storage service 322 may be included in the key data store controller 320, in which case the key data store controller 320 may receive and process the object storage requests.

The storage service 322 may include a multipart processor 324 that can receive the parts forming a data object (e.g., a large data object (e.g., 20, 50, 100, 1000+, etc., GB object) and combine and reconstruct the object for storage in the object storage 240. The parts forming the large data object may be split into a plurality of parts by a client application, and may be uploaded separately from the client application to the storage service 322. Responsive to the parts being successfully uploaded and/or the object reconstructed, the multipart processor 324 may clean up the parts by deleting them from the memor(ies) 204 and/or other non-transitory storage, which may be temporary storage. In some embodiments, if one or more parts of an object fail to successfully, the upload of the parts may be reinitialized in some cases. However, after a certain period of time and/or after a certain number of attempts, the upload of the object may be determined to be a failure and the uploaded parts may be cleaned-up/removed.

In some embodiments, responsive to a multipart upload being initiated by a client application in association with the storage service 322, the storage service 322 may signal the key data store controller 320 to issue a ticket corresponding to a timestamp associated with the initiation of the upload. The key data store controller 320 may can track the parts being uploaded and their statuses, stage part keys associated with parts that have successfully uploaded to the storage service 322 in a storage location, and insert a multipart key entry in the key data store responsive to the multipart upload completing successfully, which makes the corresponding data object visible in the key data store for subsequent operations. Additional structure and functionality of the multipart functionality of the storage service 322 and the key data store controller 320 are described in further detail below with respect to at least FIGS. 6 and 7.

In some embodiments, the storage service 322 may include a request handler that receives and parses object storage requests from client applications, such as a client application operating on various client systems 202, server systems 220, etc. As discussed elsewhere herein, the request may include any data necessary for executing the request, such as data for generating a new object key entry (e.g., key components, data value (e.g., an address, such as a link, pointer, reference, unique identifier, etc.)), data for querying entries based on the key (e.g., search terms, key components, etc.), object data to be stored in the object storage 240 (e.g., comprising a new object, modification to the object, object metadata describing the object, updates, etc.), etc. The storage service 322 may parse the data from the request and process it accordingly.

For example, responsive to receiving a request, the storage service 322 may implement the requested object storage operations in the object storage 240. For example, the storage service 322 may read, write, update, and/or otherwise manipulate objects in the object storage 240 based on parameters of the request. For instance, if the request is a write request that stores a new object to the object storage 240, the storage service 322 may write the new object to the object storage 240.

The storage service 322 may interact with the key data store controller 320 to store and retrieve data from the key data store 230. To do so, in some cases, the storage service 322 can issue various instructions to the key data store controller 320, such as but not limited to instructions comprising put, get, delete, list, request, etc.

In some embodiments, in conjunction with the implementation of an object storage operation, the storage service 322 may request that the key data store controller 320 store a new entry reflecting the operation responsive to receiving the object storage request from a client. As discussed elsewhere herein, each ticket/entry stored in the key data store 230 may be associated with an object storage operation performed at a particular point in time in association with an object in the object storage 240.

By way of further example and not limitation, the storage service 322 may request that the key data store controller 320 store an entry in the key data store 230 that corresponds with an operation being performed on a corresponding object in the object storage 240. For instance, in association with writing a new object to the object storage 240, the storage service 322 may request that the key data store controller 320 store a new entry comprising a corresponding object key (that includes the object identifier, inverse timestamp, etc.) and object reference in the key data store 230. Alternatively, when an object is deleted from the object storage 240, the storage service 322 can request that the key data store controller 320 store an entry in the key data store 230 reflecting deletion of that object, as discussed elsewhere herein. In association with that instruction, the storage service 322 may or may not delete some or all instances of the object data from the object storage 240 depending on the data retention protocol.

In some embodiments, the storage service 322 may instruct the key data store controller 320 to query the key data store 230 for one or more entries matching query criteria included in the request. For instance, responsive to receiving the request, the key data store controller 320 may query the operations associated with a particular object by querying the key data store 230 for the ordered keys associated with the object (e.g., using the object identifier, etc.), and return a result set to the storage service 322 for provision to the requester.

The storage service 322 may be coupled to the key data store controller 320, and interact with the key data store controller 320 to store and retrieve data from the key data store 230. The storage service 322 may be coupled to the key data store controller 320, and interact with the key data store controller 320 to store and retrieve data from the key data store 230.

In some embodiments, the storage service 322 may allocate space in the object storage 240 to store immutable objects. The storage service 322 may also determine and provide (e.g., to the key data store controller 320) a link or pointer to the location of the object for use in an object key associated with the object. Similarly, if a particular object or version of an object is requested by a client system (e.g., client system 202 in FIG. 2), the storage service 322 may determine where the object is stored in the object storage 240, retrieve it, and transmit it.

As discussed elsewhere herein, PUT, GET, and delete, etc., request operations result in corresponding key entries being added to the key data store 230 with keys encoded to describe the operations. When a user requests a particular data object (e.g., a read or get operation request) the storage application 224 may return the first or most-recent key entry in the ordered set of key entries stored in the key data store 230. The older key entries may also be queried for various purposes (e.g., data restoration, etc.), but eventually can become obsolete (e.g., stale, unnecessary, irrelevant due to data deletion, etc.), and can be removed from the key data store 230 by the garbage collector 326.

The garbage collector 326 comprises computer logic executable to identify and remove obsolete (e.g., unnecessary, redundant, etc.) key entries from the key data store 230. The garbage collector 326 may evaluate ordered key entries stored in the key data store 230 and garbage collect key entries based on their positioning in the key data store 230 relative other entries. For example, the garbage collector 326 may garbage collect a key entry for a particular object that is positioned in front of another key entry for that particular object having a certain operation type (e.g., delete, kill, etc.).

In some example embodiments, the garbage collector 326 may perform garbage collection in a single pass operation, whereas many existing, less efficient solutions require two or more passes (e.g., a detection phase and a reclamation phase). For instance, such a solution may require a mark phase and a sweep phase. The garbage collector 326 can therefore execute garbage collection locally and in parallel with the storage and retrieval operations of the key data store.

During garbage collection, the garbage collector 326 may traverse the entries of the key data store 230 in order and process the entries of each object. During traversal, for key entries of a given object having keys that satisfy one or more garbage collection criteria, the garbage collector 326 may retain the first (most-recent) key entry associated with that data object and remove one or more subsequent key entries associated with that data object.

In some example embodiments, over time, key entries associated with objection deletion operations (e.g., kill, delete, etc., such as entries having keys with a type "K" operation type suffix) may accumulate. Since the objects associated with those key entries have been deleted from the object storage 240, no subsequent object manipulation operations (e.g., read, put, etc., operations) are expected to occur in some cases. As such, the garbage collector 326 may remove key entries associated with those objects from the key data store 230.

In some example embodiments, the garbage collector 326 may remove deletion-related key entries (e.g., delete, kill, etc.) type key entries from the ordered set of key entries that have been in the key data store 230 for a time period larger than a maximum object transmission timeframe. Deletion-related key entries that have been stored for less than the maximum object transmission timeframe may result in the garbage collection of those entries being delayed until the maximum object transmission timeframe has passed. The garbage collector 326 may determine the age of the key entries relative to the maximum object transmission timeframe based on a comparison of the timestamp associated with the upload of the object and the current timestamp, which yields a pendency value for the upload. The garbage collector 326 may then compare the pendency value to the maximum object transmission timeframe to determine if it has been met/satisfied (e.g., exceeded, is equivalent to, etc.).

As further context, in some example embodiments, a key entry associated with an object manipulation operation (e.g., write operation) may be provided at the start of an upload operation of a data object from a client to a data storage system. Such uploads may result in a delay, such as when the associated data objects are overly large relative to the network data transmission capabilities (e.g., bandwidth, throughput, quality, etc.). The storage service 322 may determine a maximum allowed object transmission timeframe (e.g., the maximum amount of time allowed for a data object to be completely uploaded). For example, a storage service 322 could allow uploads of large data objects (e.g., that comprise several gigabytes or terabytes in size) through slow connections (e.g., connections that require 0.5-24 hours or more) to complete successfully provided they are completed within the timeframe (e.g., a maximum of two days).

Additional structure, acts, and functionality related to the garbage collector 326 are described below with reference to at least FIGS. 4 and 5.

The methods of FIGS. 4-7 are now described. With reference to these methods, each of the operations shown and/or described may correspond to instructions stored in a computer memory or computer-readable storage medium, a customized logic chip, or other suitable embodiment as discussed elsewhere herein.

Figure 4:
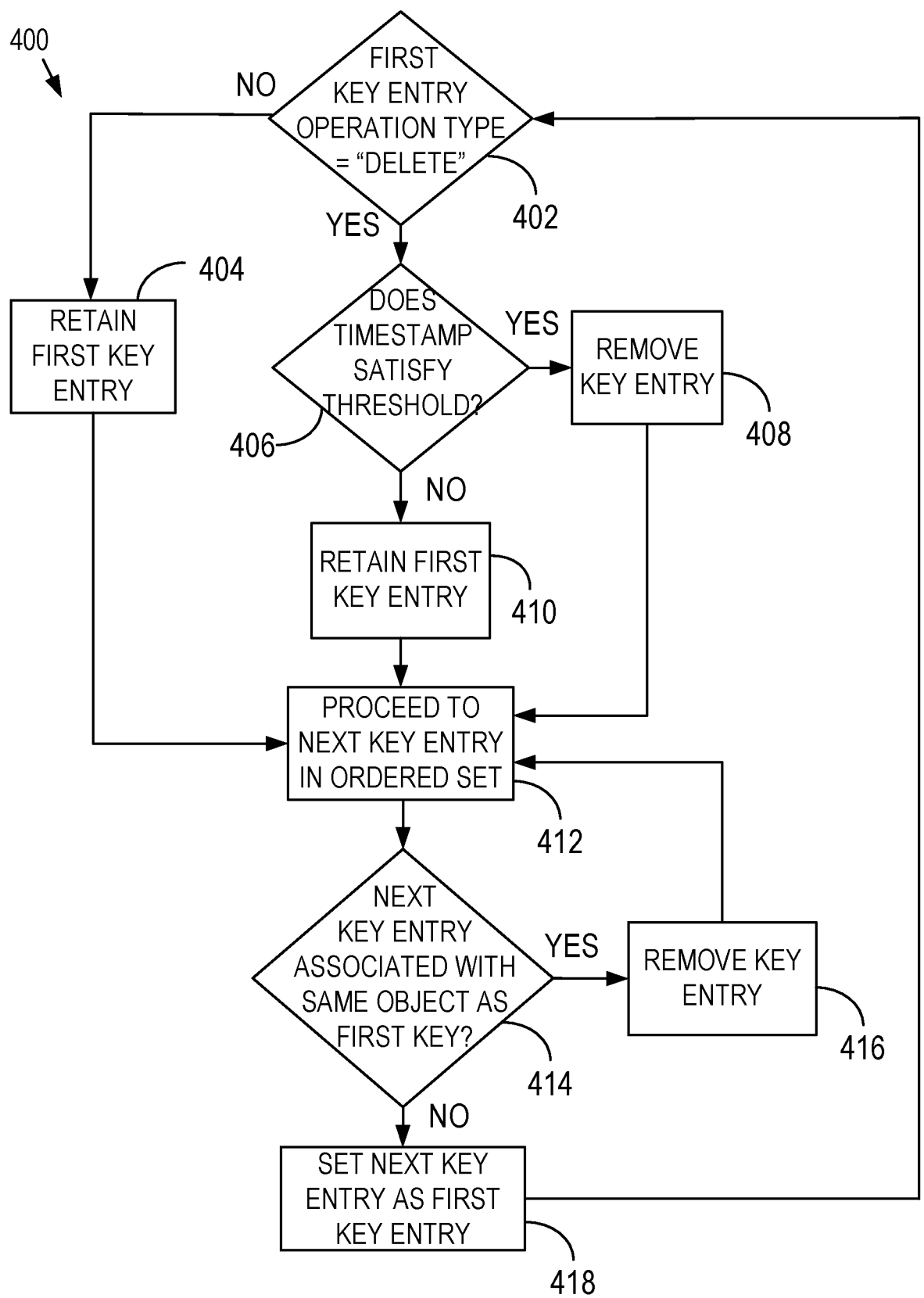
FIG. 4 is a flowchart of an example method for garbage collection in a key data store.

FIG. 4 is an example flow chart of an example method 400 for garbage collection in a key data store. Under the method 400, the storage application 224 initializes garbage collection and the garbage collector 326 proceeds to traverse some or all of the entries in the key data store 230 and garbage collect the key entries in the key data store 230 that have become obsolete. The garbage collector 326 may analyze the keys of the ordered entries to determine which entries have become obsolete.

In some embodiments, the determination to remove key entries from the key data store 230 may be based on type types of operations reflected by the keys of the entries. In particular, in block 402, the garbage collector 326 evaluates a key entry, which in this example is the first key entry being evaluated, a first key of a series of key entries associated with a given data object, the first and only key entry in the key data store 230 associated with a given data object, etc. In some embodiments, the key entry is the most-recent key entry for the data object, and therefore appears first in the ordered set of keys for that data object.

When evaluating the first key entry, which is associated with a data object, the garbage collector 326 may determine whether the operation type associated with the first key entry is a "delete" operation type. For example, the garbage collector 326 may process the key entry for attributes of the data object. As an example, the key entry may comprise a key containing an object identifier associated with the data object, operation type identifying an operation associated with the data object, and an inverse timestamp associated with the operation and the data object. As a further example, an attribute may be the operation type indicating the type of operation that was performed, and the garbage collector 326 process the attribute and determine that the operation deleted the data object or determine that the operation read, write, or other data manipulation operation other than a deletion operation.

If the determination in block 402 is negative, the garbage collector 326 retains the first key entry in the ordered set of key entries stored in the key data store 230 in block 404, and then proceeds to the next key entry in the ordered set of key entries in block 412, and in block 414, and evaluates the next entry, as discussed below.

Alternatively, if the determination in block 402 is affirmative, the garbage collector 326 may determine, in block 406, whether to remove or retain the key entry based on a garbage collection criterion. In some embodiments, in block 406, the garbage collector 326 may calculate a difference between a current inverse timestamp and the inverse timestamp contained in the key of the key entry, and determine whether the difference exceeds a garbage collection threshold. As an example, the garbage collection threshold may specify a period of time to keep key entries that correspond to object deletion operations, and once exceeded, the garbage collector 326 may remove the entries.

If the determination in block 406 is affirmative, in block 408, the garbage collector 326 may remove the key entry associated with the data object from the ordered set of key entries of the key data store. For example, with reference to FIGS. 4 and 5, in block 408, the key entry containing key 502-1 may be deleted from the revised ordered set of keys 508 stored in the key data store 230 as a result of the garbage collection criterion (e.g., specifying a retention timeframe) being exceeded (e.g., not being met). This is advantageous because, while it may be beneficial to be able to track when an object was deleted from the object storage 240 using the corresponding key entry in the key data store 230, eventually, interest in the object may fade and the object key may be removed to make room for future object storage operations.

In some embodiments, the garbage collection criterion may be based on an upload window. For example, the garbage collection criterion may specify a predetermined period of time that must elapse before a key entry may be removed. In some embodiments, is based on the maximum time that the storage system allows uploads to be pending.

For example a storage service 322 could allow uploads of data objects using slow connections to still complete successfully if they are completed within an allowable upload window (e.g., allowing or a maximum delay of a certain period of time). For example and not limitation, the upload window may be 48 hours. In this example, to help ensure that a write operation and a delete operation for the same object do not conflict, the garbage collector 326 evaluates the entries in such a way to avoid the conflict.

For example, a put operation for a data object "K2" starts at TS (timestamp): 10, which results in an inverse timestamp of 90. However, the put operations takes two days to compete at TS:40, which would result in the key entry for the put operation not be inserted in the key data store 230 until TS:40. In the interim, at TS:30, a delete operation is executed, which has inverse timestamp of 70.

To avoid the key entry for the delete operation from being garbage collected before the older entry for the now erroneous put operation is inserted into the key data store 230, the threshold in block 406 may be defined to correspond to the maximum upload window, so that the key entry for the put operation is inserted before garbage collection of the key entry for the delete operation is performed. For example, by doing so, the delete key entry and the put key entry may both be correctly listed in the ordered set of keys in the key data store 230, and thus correctly processed by the garbage collector 326.

"K2".70.K
"K2".90.W

However, if such a garbage collection threshold is not used, the delete key entry may be removed and the put operation may be erroneously left in the key data store 230, as reflected below.

"K2".90.W

Accordingly, in some embodiments, the garbage collector 326 may be configured to only remove key entries with delete type keys from the ordered set of keys for which it is clear from the key of the entry, that a time period larger than the predetermined upload window has passed. In some embodiments, the value for the threshold may be calculated by determining the current timestamp, subtracting the maximum delay for a put operation from it, and subtracting the difference from the reference timestamp to determine a minimum timestamp for a delete operation entry. For instance, if the current timestamp (and the timestamp of a put operation) is TS:40 and the maximum delay of 48 hours relates to a timestamp TS:40−20=20, a minimum TS value for a delete key entry may be set to 80 using a reference timestamp of 100. The garbage collector 326 may then only remove delete operation keys that satisfy (e.g., exceed) this minimum TS value to help prevent erroneous remove of keys, such as delete operation keys, that may be inserted in the key data store 230 during the upload.

Referring again to FIG. 4, if the determination in block 406 is negative, then the garbage collector 326 may retain the object key in the ordered set of keys in block 410.

In block 414, the garbage collector 326 determines whether the next key entry references the first data object. For instance, the garbage collector 326 determines whether the next key entry is associated with the same data object as the first key entry. In a further example, the garbage collector 326 parses the object identifier from the key of the next key entry, compares it to the object identifier of the first key entry, and determine that the object identifiers match.

If the determination in block 414 is negative, the garbage collector 326 may set the next key entry as the first key entry for the object referenced by the key of the next key entry, and the method 400 returns to block 402 to process that key entry, which is now considered the first key entry in a potential sequence of entries for a next data object. Alternatively, if the determination in block 414 is affirmative, the garbage collector may, in block 416, remove the key entry from the ordered set of key entries stored in the key data store 230, and the method 400 may return to block 412, where the next key entry in the ordered set is evaluated. If there are no additional key entries to be processed, the method 400 may terminate or proceed to other operations.

The loop formed by blocks 412, 414, and 416 may repeat for as many key entries that may exist for the same object, such that the garbage collector 326 may evaluate one or more next key entries, determine that the object identifier from each of the one or more next key entries references the same data object as the first key entry referenced in blocks 402 and 404, and may remove the one or more next key entries from the ordered set of key entries of the key data store, responsive to determining such. In some cases, the one or more next key entries may be ordered sequentially immediately after the previously evaluated entry (e.g., in 412, in 402, etc.) in the ordered key data store.

Figure 5:
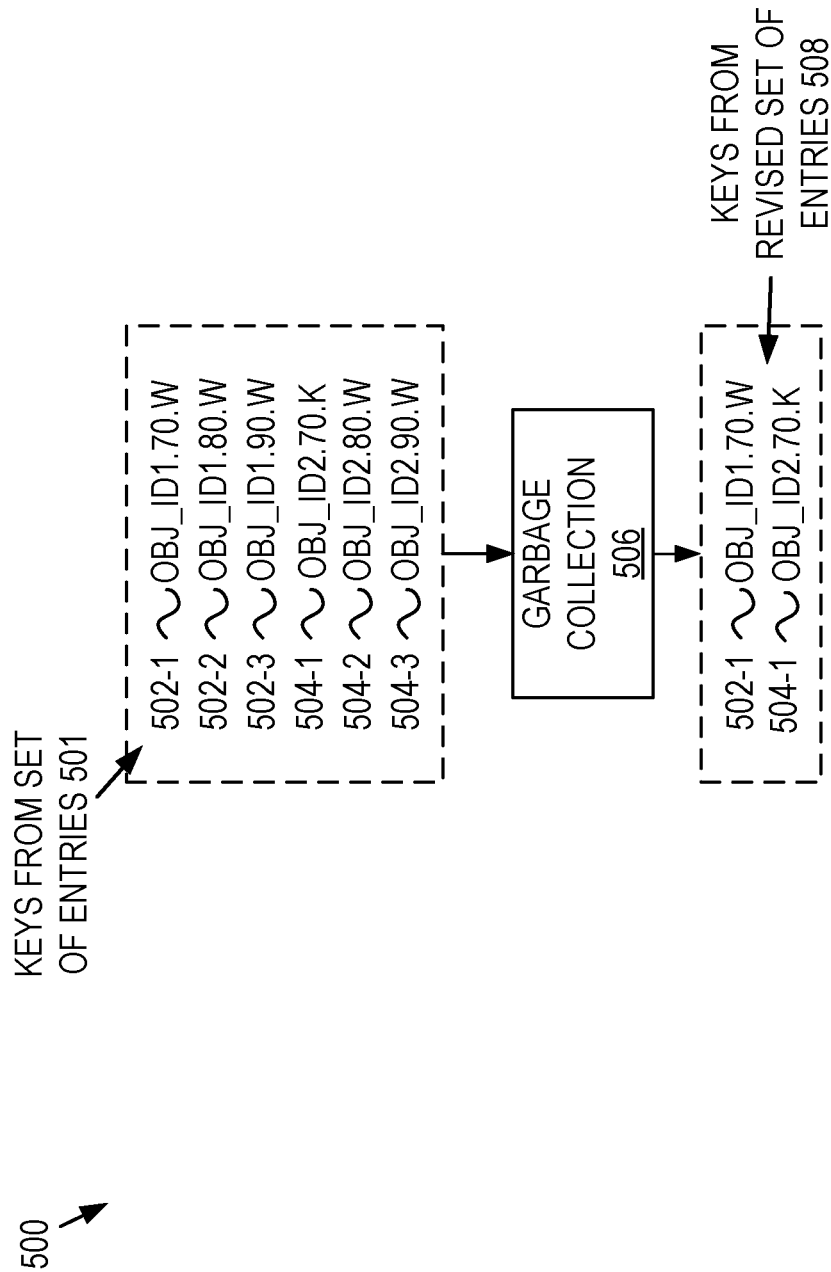
FIG. 5 is a non-limiting example garbage collection scenario.

FIG. 5 is a non-limiting example garbage collection scenario 500 that further illustrates the operations of method 400. In this example, an ordered set of keys entries 501 may be stored in the key data store 230 at a particular point in time. The keys from the ordered set of entries 501 are depicted.

As shown in FIG. 5, the keys of the set 501 are processed by the garbage collector 326 in block 506 in the order depicted. The garbage collector 326 determines that the first three keys 502-1, 502-2, and 502-3 are associated with the same object, as indicated by the object identifier dimension of the keys ("OBJ_ID1"). More particularly, the garbage collector 326 first evaluates the key entry containing key 502-1 and determines that it is associated with OBJ_ID1. Additionally, because the ordering of the entries 501 sorts the entries from most-recent to least recent, and because the key entry containing key 502-1 appears first in the set of entries 501, the garbage collector 326 can identify it as being the most-recent entry associated with OBJ_ID1. Because the entry containing key 502-1 is the most-recent entry for OBJ_ID1, the garbage collector 326 determines to retain the key entry containing the key 502-1 in the key data store 230, as shown in the revised set of entries 508.

Next, the garbage collector 326 evaluates the second key entry by processing it's key 502-2 and determines from the attributes contained in the key that the entry is also associated with OBJ_ID1, but that the entry is older than the first entry, and thus the operation represented by the second entry occurred earlier than the operation represented by the first entry. In this example, a garbage collection criterion may specify to only keep the most-recent key entry for each object, in which case the key 502-2 may be removed from the key data store 230. In other examples, however, the garbage collection criterion may specify to keep N number of entries for each object, where N may be any suitable number (e.g., integer). For example, the criterion may specify to preserve the last 10 entries, or the criterion may be based on the type of object reflected by OBJ_ID, and may vary object type (e.g., for pictures the number may be 5, for word processing documents, the number may be 20, etc.). Numerous other variations are also possible and contemplated.

Because in this example, N is set to 1, the garbage collector 326 may evaluate the third key entry by processing it's key 502-3 and determine from the attributes contained in the key that the entry is also associated with OBJ_ID1 and that it is also older than the first entry, and as such, may also determine to remove the entry from the key data store 230.

Next, in evaluating the fourth key 504-1 of the fourth key entry, the garbage collector 326 determines that the fourth entry is the first entry associated with a different object than the object associated with the first three entries (OBJ_ID2 vs OBJ_ID1). As such, since the garbage collection criteria specify to preserve at least the most-recent entry for each data object, the garbage collector 326 retains the fourth entry containing the fourth key 504 in the revised set of entries 508.

Further, the garbage collector 326 may also determine from the key 504-1, that the operation associated with that key is a delete operation. More particularly, the garbage collector 326 may parse the key entry 504-1 using the "." delimiter into an array of values and determine that the third entry in the parsed array, which specifies the operation type, has a value of "K," which represents in this example the data object associated with the entry was deleted from the object storage 240. Responsive to determining that the operation associated with the fourth entry is a delete operation, the garbage collector 326 may be configured to remove any entries that following the delete operation in the set of entries 501.

For instance, the garbage collector 326 stores in memory the object identifier and operation type of the first entry, and proceeds to the next key entry to determine if it is also related to the same object as reflected in the memory, and if so removes that entry from the key data store 230 based on the operation type (e.g., a deletion operation), and so forth. In the example shown in FIG. 5, key entries 504-2 and 504-3 are both determined to have the same object identifier as key entry 504-1, and are thus removed and not included in the revised plurality of key entries 508. In this example, these entries reflect older write operations (e.g., based on the W dimension value) that have become obsolete because the object OBJ_ID2 has been deleted from the object store 240, as reflected by the fourth key entry.

In further examples, the garbage collection criteria may specify to preserve a certain number of entries included after a delete operation for a given object, in which case the garbage collector 326 may retain entries up to the number of entries specified by the garbage collection criteria. Other variations are also possible and contemplated.

Figure 6:
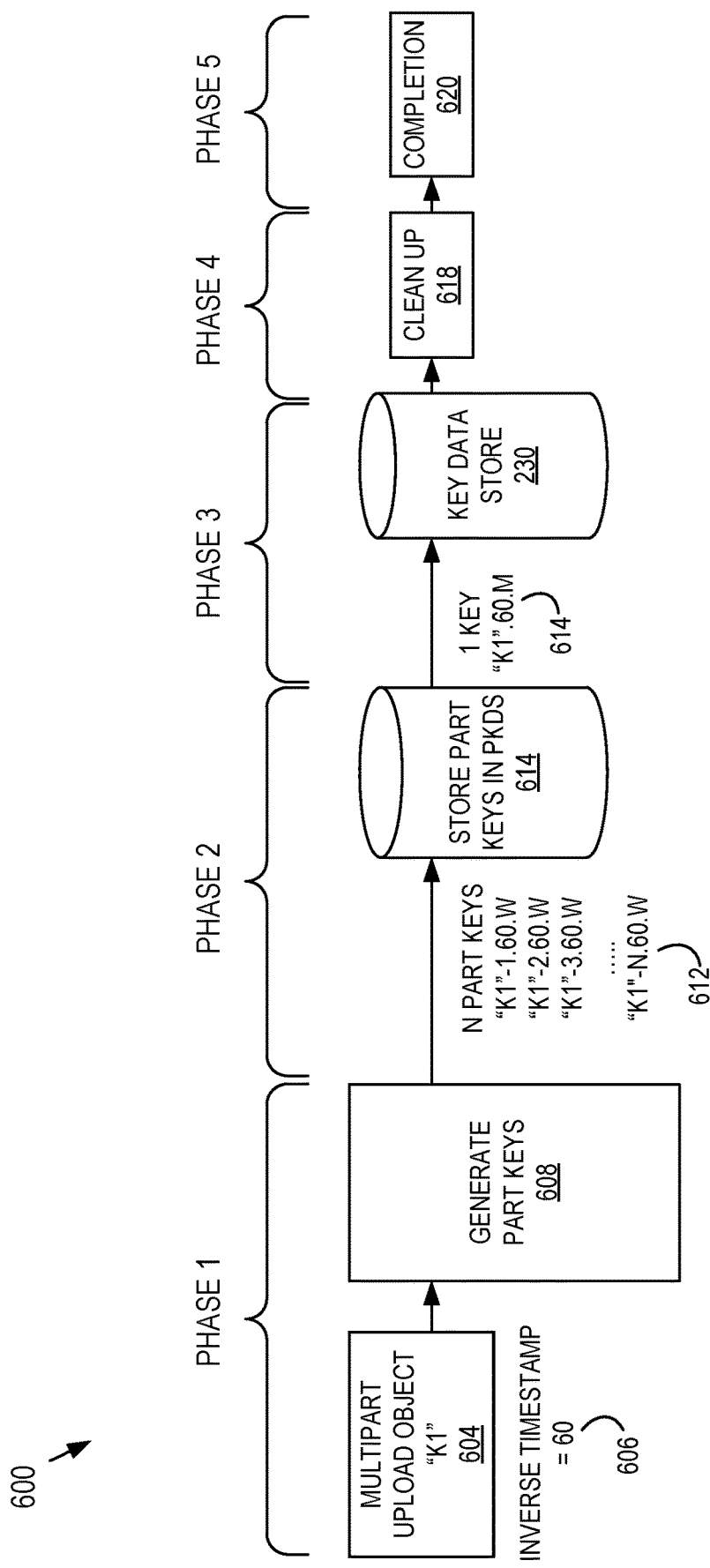
FIG. 6 is a flow chart of an example method for multipart uploading data objects.
Figure 7:
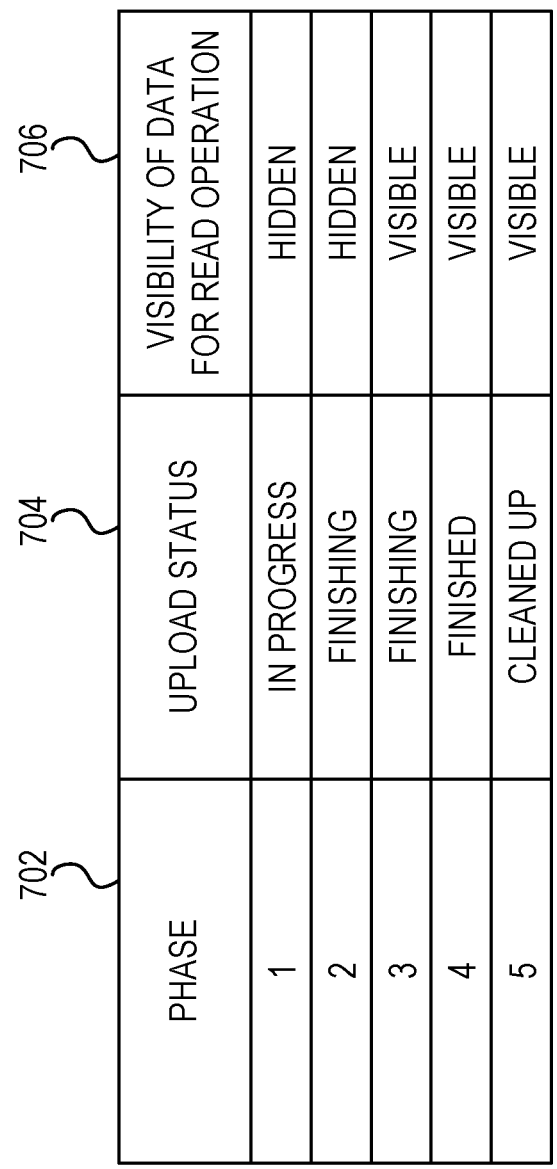
FIG. 7 is an example chart showing the status and availability of a data object during the phases of a multipart object upload.

FIG. 6 is a flow chart of an example method 600 for multipart uploading data objects for storage in the object storage 240. As shown, the method 600 may comprise a series of phases (e.g., phase 1 through phase 5), although it should be understood that other configurations of method 600 are also possible which may include fewer or additional phases. FIG. 7 is a chart showing the status and availability of a data object during the phases referenced in FIG. 6. The chart in FIG. 7 includes a column representing the phase 702, a column representing the upload status 704, and a column representing the visibility of data for a read operation 706.

Referring to FIG. 6, in phase 1, and more particularly, in block 604, a data object, in this example "K1," is uploaded for storage in the object store 240 using a multipart upload process. Multipart uploads of data objects, particularly data objects that require significant time to upload due to their size (e.g., large objects, such as objects that require more time to upload than a user is willing to wait at a computing device for completion of the upload, 10 minutes or more, hours, days, etc.), are increasingly common as the size of objects continue to proliferate (e.g., complex model files, video files, multimedia files, etc.). Multipart uploading allows such objects to be divided up and uploaded in a plurality of smaller parts. The number of parts may be any suitable number, and in some cases may be a configurable variable set by a system administrator, user, the storage application 224, dynamically based on connection characteristics, etc.

By way of example, a large data object, such as a 20 GB data object, could be uploaded by a storage client to the data storage server system 220 by first splitting the object into a plurality of parts, such as 10,000 2 MB parts, and then uploading the parts (e.g., asynchronously, in parallel, etc.) to the server system 200 for storage.

The multipart processor 324 may receive and process the parts, as discussed elsewhere herein. The multipart processor 324 may track the part uploads, and after all parts are determined to be successfully uploaded, the multipart processor 324 combines the parts into a single data object, thereby reconstructing data object for storage in the object storage 240. The multipart processor 324 may remove the parts to conserve space, leaving the uploaded data object available for subsequent data manipulation operations.

In some embodiments, in block 602, the storage service 322 may receive a storage request from a client application, in response, may notify the key data storage controller 320 of the storage request. The storage request may indicate the identity of the data object, that the storage request is a multipart upload request, and a timestamp of the storage request, etc. The key data storage controller 320 may, in response, determine a timestamp and object name for the multipart upload operation. In some embodiments, the timestamp may generated as an inverse timestamp as discussed elsewhere herein (e.g., see 606, which in this example is 60). In some cases, the timestamp from the storage request may be used to generate the inverse timestamp, although other variation are also possible as discussed elsewhere herein.

In some embodiments, if the upload has failed with some of the sub-parts uploaded, the uploading of the failed parts can be retried without having to re-upload the already uploaded parts.

In block 608, the key data store controller 320 may generate temporary keys for the separate object parts of the data object. In some embodiments, this may include generating, for each object part, a part key containing a part key identifier identifying the object part and an inverse timestamp associated with the upload of the data object. The part key may indicate a sequential part number for the object part. For example, a part key may comprise three or more key dimensions: a part key identifier comprised of the object name and the part number (e.g., "K1"–1), a timestamp (e.g., the inverse timestamp), and an operation type (e.g., W for write). For example, for each of the 10,000 parts, the part key may reflect to which of the 10,000 parts the key corresponds. For instance, as shown by reference number 612, the part keys iterate from 1 up to N, with N being the number of parts that the object was split into.

In some embodiments, the key data store controller 320 may allocate memory for storing the temporary keys, and the key data store controller 320 may generate the part key for that part and store it in the allocated memory. For example, the key data store controller 320 may use scratchpad memory (SPM), which may comprise high-speed internal memory used for temporary storage of calculations, data, and other work in progress. The key data store controller 320 may store the temporary keys in the memory while the separate object parts are uploaded. In some embodiments, the key data store controller 320 may incrementally create and store the temporary keys, which may comprise part keys, responsive to the incremental uploading of the parts (e.g., as the upload for a given part is initialized and progresses to completion, a part key may be generated). In some embodiments, the part key for a given object is created and stored in the allocated memory responsive to the completion of the upload of that object.

As shown in the chart in FIG. 7, the object status during Phase 1 may tracked by the key data store controller 320 and set to "in progress." Referring to the above example involving the splitting of a data object into 10,000 separate object parts, in phase 1, the key data store controller 320 may generate 10,000 corresponding temporary keys for these object parts responsive to the respective uploading of the object parts, completion of the respective uploading of the object parts, etc. By way of non-limiting example, depending on the connection speed and other data transmission variables, phase 1 may take from an hour or so to several days to complete. During phase 1, the data object may not be visible in the key data store 230 for data manipulation (e.g., read) operations, in some cases.

In phase 2, the key data store controller 320 stores the temporary keys in a temporary key data store, as shown in operation 614. In some embodiments, responsive to determining that the separate object parts are uploaded, the key data store controller 320 copies the temporary keys from the memory to the temporary key data store. For example, responsive to each of the parts of the data object being successfully uploaded to the storage service 322, the allocated memory includes a part key (temporary key) for each of the parts. The key data store controller 320 copies the part keys from the memory to a part key data store (PKDS) (the temporary key data store). The part key data store may operate the same or similar to the key data store, such that it stores an ordered set of part key entries that include the part keys in an order based on the dimensions of the part keys. Storage of the entries in the PKDS may be temporary, however. By way of example, the part key entries may be ordered in a sequence corresponding to the part numbers of the parts (e.g., from part 1 to part 10,000) as reflected by the part identifiers.

As shown in the chart in FIG. 7, once phase 2 has commenced, the upload status is set by the key data store controller 320 to "finishing," and the data object remains hidden for data manipulation operations during phase 2. At the end of phase 2, the storage service 322 can use the stored part keys (which have been ordered in the PKDS) to reassemble the original data object "K1." For instance, the storage service 322 may determine the ordering and name of the parts using the keys stored in the PKDS.

In phase 3, the key data store controller 320 inserts a multipart key entry in the key data store 230, which may comprise a persistent key data store relative to the temporary key data store. The multipart key entry may be stored in a position in the ordered set of keys of the key data store 230 that is determined by the object identifier and the inverse timestamp. In further cases, the position may further be based on the operation type contained in the multipart key. The operation type may represent a multipart-based data manipulation operation. For example, the key entry may include, for the operation type, an "M" which may be indicative of a multipart upload, although numerous other formats and variations are also possible and contemplated.

In some cases, the identifier for specifying a multipart type operation may be selected to so that the key entry may be positioned in the ordered set of keys for that object before key entries including a write operation indicator (e.g., W) and key entries including a delete operation indicator (e.g., K). This can be beneficial and it can help to prevent a conflict between a multipart upload operation and a put operation that may occur at the same timestamp, which, in some cases, could prevent the successful uploading of the multipart data object to be determined to be complete.

In some embodiments, the multipart key may be inserted in the key data store 230 responsive to the data object being reassembled by the storage service 322 and/or stored in the objection storage 240. The key data store controller 320 may generate the single multipart key based on the attributes of the data object. For example, the dimensions of the multipart key may comprise in a first position, an object identifier, in a second position, an inverse timestamp, and in a third position, an operation type reflecting a multipart write operation, etc., although other dimension sequences are also possible and contemplated. As discussed elsewhere herein, the dimensions comprising the key may be delimited in some cases.

As shown in the chart in FIG. 7, the status of the multipart upload status for phase 3 is set to "finishing," however, the data object may become visible for read operations. For instance, responsive to the multipart key entry being inserted in the key data store 230, the key data store controller 320 may become visible in the key data store 230 and may remain visible for use in subsequent read operations.

In phase 4, the key data store controller 320 may delete temporary keys from the memory and/or release the allocated memory in block 618, and may delete temporary keys for the separate object parts from the temporary key data store. Any other metadata and/or information that is no longer needed may also be deleted. In some cases, the temporary key data store may be deleted or allocated to another operation. Further, in some cases, the storage service 322 may delete the separate object parts, metadata, and/or other information used to reconstitute the data object.

For example, as shown in the chart in FIG. 7, in phase 4, the key data store controller 320 may set the upload status to "Finished." In phase 5, under block 620, the key data store controller 320, responsive the clean up being completed, may set the upload status to complete, "Cleaned up," etc.

To ease understanding, some elements (e.g., requests, identifiers, timestamps, operations, etc.), may be referred to in the description and/or the claims using the labels first, second, third, etc. These labels are intended in some cases to help to distinguish the elements, but do not necessarily imply any particular order or ranking unless indicated otherwise.

Referring again to FIG. 3, in some embodiments, the key data store controller 320 may determine that the number of key entries stored in the ordered set of key entries satisfies (e.g., exceeds) a predetermined threshold. The threshold may reflect the amount of storage space that can be acceptably utilized (e.g., a percentage of utilized storage space relative to a maximum). Responsive to such a determination, the key data store controller 320 may add an additional shard, in which case the key data store controller 320 may redistribute the key entries between the shards to help ensure that the key entries are more evenly spread between the database shards. In some cases, the key data store controller 320 may update a range table to accurately represent which key entries are stored on which database shards. In further embodiments, the key data store controller 320 may create new shards or re-shard the existing database shards for additional reasons including, but not limited to, improve performance of key data store 230, compliance to rules/laws/regulations, security policies, and/or load requirements of the key data store 230, and/or other suitable purposes.

The processor(s) 302 may execute software instructions by performing various input/output, logical, and/or mathematical operations. The processor(s) 302 may have various computing architectures to process data signals including, for example, a complex instruction set computer (CISC) architecture, a reduced instruction set computer (RISC) architecture, and/or an architecture implementing a combination of instruction sets. The processor(s) 302 may be physical and/or virtual, and may include a single processing unit and/or core or plurality of processing units and/or cores.

In some embodiments, the processor(s) 302 may be capable of generating and providing electronic display signals to a display device (not shown), supporting the display of images, capturing and transmitting images, performing complex tasks including various types of feature extraction and sampling, etc. In some embodiments, the processor(s) 302 may be coupled to the memor(ies) 304 via a communication bus 306 to access data and instructions therefrom and store data therein. The communication bus 306 may couple the processor(s) to the other components of the computing system 300, for example, memor(ies) 304, communication unit(s) 308, physical storage devices and/or storage systems (e.g., object storage 240, key data store 230).

The memor(ies) 304 may store and provide access to data to the other components of the computing system 300. The memor(ies) 304 may store instructions and/or data that may be executed by the processor(s) 302. For example, the memor(ies) 304 may store an instance of the storage application 224, software implementing the key data store 230, cached keys and objects, parameters, operating system(s), drivers, databases, and/or other software applications, etc. The memor(ies) 304 may be coupled to the bus 306 for communication with the processor(s) 302 and the other components of computing system 300.

The memor(ies) 304 may include a non-transitory computer-usable (e.g., readable, writeable, etc.) medium, which can be any non-transitory apparatus or device that can contain, store, communicate, propagate or transport instructions, data, computer programs, software, code, routines, etc., for processing by or in connection with the processor(s) 302. In some embodiments, the memor(ies) 304 may include one or more of volatile memory and non-volatile memory (e.g., RAM, ROM, flash, solid state drive, hard drive, optical disc, tape, magnetic diskette, etc.). It should be understood that the memor(ies) 304 may include a single device or may include multiple types of devices and configurations.

The communication unit 308 may include one or more interface devices for wired and wireless communication with the network 210 and the other entities and/or components of the system 200 including, for example, the client systems 202, server systems 220, object storage 240, etc. For instance, the communication unit 308 may include, but is not limited to, CAT-type interfaces; wireless transceivers for sending and receiving signals using Wi-Fi™; Bluetooth®, cellular communications, etc.; USB interfaces; various combinations thereof; etc. In some embodiments, the communication unit 308 can link the processor(s) 302 to the network 210, which may in turn be coupled to other processing systems. The communication unit 308 can provide other connections to the network 210 and to other entities of the system 300 using various communication protocols, including, for example, those discussed elsewhere, herein. In some instances, the communication unit 308 includes a wired port and a wireless transceiver. The communication unit 308 also provides other connections to the network 210 for distribution of files and/or media objects using various network protocols, such as those discussed elsewhere herein.

In some embodiments, the computing system 300 may include a software communication mechanism implemented via the network 210 and/or communication bus 306 that can include and/or facilitate, for example, inter-method communication, local function or procedure calls, remote procedure calls, an object broker (e.g., CORBA), direct socket communication (e.g., TCP/IP sockets) among software modules, UDP broadcasts and receipts, HTTP connections, etc. Further, any or all of the communication could be secure (e.g., SSH, HTTPS, etc.).

In the above description, for purposes of explanation, numerous specific details are set forth to provide a thorough understanding of the various aspects of different example embodiments. It should be evident, however, that any particular example embodiment may in various cases be practiced without all of the specific details and/or with variations, permutations, and combinations of the various features and elements described herein.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in enough detail to enable the disclosed teachings to be practiced. Other embodiments may be used and derived therefrom, such that structural and logical substitutions and changes may be made without departing from the scope of this disclosure. The Detailed Description, therefore, is not to be taken in a limiting sense, and the scope of various embodiments is defined by the below claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The foregoing description, for the purpose of explanation, has been described with reference to specific example embodiments. However, the illustrative discussions above are not intended to be exhaustive or to limit the possible example embodiments to the precise forms disclosed. Many modifications and variations are possible in view of the above teachings. The example embodiments were chosen and described in order to best explain the principles involved and their practical applications, to thereby enable others to best utilize the various example embodiments with various modifications as are suited to the particular use contemplated.

It should also be understood that, although the terms "first," "second," and so forth may be used herein to describe various elements, these elements should not be limited by these terms. These terms are only used to distinguish one element from another. For example, a first contact could be termed a second contact, and, similarly, a second contact could be termed a first contact, without departing from the scope of the present example embodiments. The first contact and the second contact are both contacts, but they are not the same contact.

The terminology used in the description of the example embodiments herein is for describing particular example embodiments only and is not intended to be limiting. As used in the description of the example embodiments and the appended claims, the singular forms "a," "an," and "the" are intended to include the plural forms as well, unless the context clearly indicates otherwise. It should also be understood that the term "and/or" as used herein refers to and encompasses any and/or all possible combinations of one or more of the associated listed items. It should be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The invention claimed is:

1. A computer-implemented method comprising:
   initializing garbage collection of obsolete key entries stored in a key data store, wherein:
      the key data store is configured to store an ordered set of key entries;
      each key entry in the ordered set of key entries comprises a key comprising:
         an object identifier associated with a corresponding data object;
         an operation type identifying an operation associated with the corresponding data object; and
         an inverse timestamp associated with the operation and the corresponding data object; and
      the ordered set of key entries are ordered by:
         the object identifier of the key of each key entry; and
         the inverse timestamp of the key of each key entry;
   evaluating a target key entry in the ordered set of key entries that is associated with a first data object;
   determining, based on the operation type of the target key entry, whether the operation associated with the first data object is a delete operation;
   performing garbage collection operations based on timestamp comparisons responsive to the operation associated with the first data object being a delete operation;
   determining, based on a garbage collection criterion, a number of key entries associated with the first data object to retain in the ordered set of key entries, wherein the determined number is based on a type of object indicated by the object identifier of the target key entry; and
   removing key entries associated with the first data object exceeding the determined number of key entries.

2. The computer-implemented method of claim 1, wherein the performing garbage collection operations based on timestamp comparisons further comprises:

determining a difference between a current inverse timestamp and the inverse timestamp contained in the key of the target key entry;

determining that the difference satisfies a garbage collection threshold; and removing, responsive to determining that the difference satisfies the garbage collection threshold, all key entries, including the target key entry, associated with the first data object from the ordered set of key entries of the key data store.

3. The computer-implemented method of claim 1, wherein the performing garbage collection operations based on timestamp comparisons further comprises:

determining a difference between a current inverse timestamp and the inverse timestamp contained in the key of the target key entry;

determining that the difference does not satisfy a garbage collection threshold; and retaining, responsive to determining that the difference does not satisfy the garbage collection threshold, the determined number of key entries, including the target key entry, that is associated with the first data object in the ordered set of key entries.

4. The computer-implemented method of claim 1, further comprising:

evaluating one or more next key entries relative to the target key entry;

determining that an object identifier from each key entry of the one or more next key entries references the first data object;

retaining the determined number of the one or more next key entries; and removing any next key entries of the one or more next key entries exceeding the determined number of key entries from the ordered set of key entries of the key data store.

5. The computer-implemented method of claim 4, wherein the one or more next key entries are ordered sequentially immediately after the target key entry in the key data store.

6. The computer-implemented method of claim 4, wherein the ordered set of key entries is ordered alphanumerically.

7. The computer-implemented method of claim 1, wherein the garbage collection criterion is based on an upload window of a write operation.

8. A computer-implemented method comprising:

initializing garbage collection of obsolete key entries stored in a key data store, wherein:

the key data store is configured to store an ordered set of key entries;

each key entry in the ordered set of key entries comprises a key comprising:

an object identifier associated with a corresponding data object;

an operation type identifying an operation associated with the corresponding data object; and an inverse timestamp associated with the operation and the corresponding data object; and the ordered set of key entries are ordered by:

the object identifier of the key of each key entry; and the inverse timestamp of the key of each key entry;

evaluating a target key entry in the ordered set of key entries that is associated with a first data object;

determining, based on the operation type in the key of the target key entry, whether the operation associated with the first data object is one of a read operation and a write operation;

skipping garbage collection operations based on timestamp comparisons responsive to the operation associated with the first data object being one of a read operation and a write operation;

determining a number of key entries associated with the first data object to retain in the ordered set of key entries of the key data store, wherein the determined number is based on a type of object indicated by the object identifier of the target key entry; and removing key entries associated with the first data object exceeding the determined number of key entries.

9. The computer-implemented method of claim 8, wherein the target key entry is a most-recent key entry for the first data object in the ordered set of key entries in the key data store.

10. The computer-implemented method of claim 8, further comprising:

evaluating one or more next key entries relative to the target key entry;

determining that an object identifier from each key entry of the one or more next key entries references the first data object;

retaining the determined number of the one or more next key entries; and removing any next key entries of the one or more next key entries exceeding the determined number of key entries from the ordered set of key entries of the key data store.

11. The computer-implemented method of claim 8, further comprising:

evaluating a next key entry relative to the target key entry in the ordered set of key entries;

determining that an object identifier from a key of the next key entry references a different data object than the first data object;

determining that a delete operation is specified by an operation type from the key of the next key entry; and responsive to determining that the delete operation is specified by the operation type from the key of the next key entry, determining, based on a garbage collection criterion, whether to remove the target key entry associated with the first data object from the ordered set of key entries of the key data store or retain the target key entry in the ordered set of key entries.

12. A storage system comprising:

one or more processors; and one or more memories coupled to the one or more processors, the one or more memories storing instructions that, when executed by the one or more processors, perform operations comprising:

initializing garbage collection of obsolete key entries stored in a key data store, wherein:

the key data store is configured to store an ordered set of key entries;

each key entry in the ordered set of key entries comprises a key comprising:

an object identifier associated with a corresponding data object;

an operation type identifying an operation associated with the corresponding data object; and an inverse timestamp associated with the operation and the corresponding data object; and the ordered set of key entries are ordered by:

the object identifier of the key of each key entry; and the inverse timestamp of the key of each key entry;

evaluating a target key entry in the ordered set of key entries that is associated with a first data object;
determining, based on the operation type in the key of the target key entry, whether the operation associated with the first data object is a delete operation;
performing garbage collection operations based on timestamp comparisons responsive to the operation associated with the first data object being a delete operation;
determining, based on a garbage collection criterion, a number of key entries associated with the first data object to in the ordered set of key entries, wherein the determined number is based on a type of object indicated by the object identifier of the target key entry; and
removing key entries associated with the first data object exceeding the determined number of key entries.

13. The storage system of claim 12, wherein the performing garbage collection operations based on timestamp comparisons further comprises:
determining a difference between a current inverse timestamp and the inverse timestamp contained in the key of the target key entry;
determining that the difference satisfies a garbage collection threshold; and
removing, responsive to determining that the difference satisfies the garbage collection threshold, all key entries, including the target key entry, associated with the first data object from the ordered set of key entries of the key data store.

14. The storage system of claim 12, wherein the performing garbage collection operations based on timestamp comparisons further comprises:
determining a difference between a current inverse timestamp and the inverse timestamp contained in the key of the target key entry;
determining that the difference does not satisfy a garbage collection threshold; and
retaining, responsive to determining that the difference does not satisfy the garbage collection threshold, the determined number of key entries, including the target key entry, that is associated with the first data object in the ordered set of key entries.

15. The storage system of claim 12, wherein the operations further comprise:
evaluating one or more next key entries relative to the target key entry;
determining that an object identifier from each key entry of the one or more next key entries references the first data object;
retaining the determined number of the one or more next key entries; and
removing any next key entries of the one or more next key entries exceeding the determined number of key entries from the ordered set of key entries of the key data store.

16. A storage system comprising:
means for initializing garbage collection of obsolete key entries stored in a key data store, wherein:
the key data store is configured to store an ordered set of key entries;
each key entry in the ordered set of key entries comprises a key comprising:
an object identifier associated with a corresponding data object;
an operation type identifying an operation associated with the corresponding data object; and
an inverse timestamp associated with the operation and the corresponding data object; and
the ordered set of key entries are ordered by:
the object identifier of the key of each key entry; and
the inverse timestamp of the key of each key entry;
means for evaluating a target key entry in the ordered set of key entries that is associated with a first data object;
means for determining, based on the operation type in the key of the target key entry, whether the operation associated with the first data object is one of a read operation and a write operation;
means for skipping garbage collection operations based on timestamp comparisons responsive to the operation associated with the first data object being one of a read operation and a write operation;
means for determining, a number of key entries associated with the first data object to retain in the ordered set of key entries of the key data store, wherein the determined number is based on a type of object indicated by the object identifier of the target key entry; and
means for removing key entries associated with the first data object exceeding the determined number of key entries.

17. A computer-implemented method comprising:
initializing garbage collection of obsolete key entries stored in a key data store, wherein:
the key data store is configured to store an ordered set of key entries;
each key entry in the ordered set of key entries comprises a key comprising:
an object identifier associated with a corresponding data object;
an operation type identifying an operation associated with the corresponding data object; and
an inverse timestamp associated with the operation and the corresponding data object; and
the ordered set of key entries are ordered by:
the object identifier of the key of each key entry; and
the inverse timestamp of the key of each key entry;
evaluating a target key entry in the ordered set of key entries that is associated with a first data object;
determining, based on the operation type in the key of the target key entry, whether the operation associated with the first data object is a multipart upload operation;
skipping garbage collection operations based on timestamp comparison responsive to the operation associated with the first data object being a multipart upload operation;
determining a number of key entries associated with the first data object to retain in the ordered set of key entries of the key data store, wherein the determined number is based on a type of object indicated by the object identifier of the target key entry; and
removing key entries associated with the first data object exceeding the determined number of key entries.

18. The computer-implemented method of claim 17, wherein the target key entry is a most-recent key entry for the first data object in the ordered set of key entries in the key data store.

19. The computer-implemented method of claim 17, further comprising:
evaluating one or more next key entries relative to the target key entry;
determining that an object identifier from each key entry of the one or more next key entries references the first data object;

retaining the determined number of the one or more next key entries; and removing any next key entries of the one or more next key entries exceeding the determined number of key entries from the ordered set of key entries of the key data store.

* * * * *